US009245334B2

(12) United States Patent  (10) Patent No.: US 9,245,334 B2
Lipton et al.  (45) Date of Patent: Jan. 26, 2016

(54) METHODS FOR QUANTITATIVE ASSESSMENT OF VOLUMETRIC IMAGE FROM A SUBJECT AND USES THEROF

(71) Applicants: Michael L. Lipton, Passaic, NJ (US); Namhee Kim, Bronx, NY (US)

(72) Inventors: Michael L. Lipton, Passaic, NJ (US); Namhee Kim, Bronx, NY (US)

(73) Assignee: Albert Einstein College of Medicine, Inc., Bronx, NY (US)

( * ) Notice: Subject to any disclaimer, the term of this patent is extended or adjusted under 35 U.S.C. 154(b) by 287 days.

(21) Appl. No.: 13/775,312

(22) Filed: Feb. 25, 2013

(65) Prior Publication Data

US 2013/0223714 A1  Aug. 29, 2013

Related U.S. Application Data

(60) Provisional application No. 61/604,167, filed on Feb. 28, 2012.

(51) Int. Cl.
*G06K 9/00* (2006.01)
*G06T 7/00* (2006.01)

(52) U.S. Cl.
CPC ............ *G06T 7/0012* (2013.01); *G06T 7/0014* (2013.01); *G06T 2200/04* (2013.01); *G06T 2207/10072* (2013.01); *G06T 2207/30016* (2013.01)

(58) Field of Classification Search
CPC ................... G06T 7/0012; G06T 2207/30016; G06T 2207/10072; G06T 2200/04; G06T 7/0014
USPC ......................................... 382/128–132, 154
See application file for complete search history.

(56) References Cited

U.S. PATENT DOCUMENTS

| 5,233,992 | A | 8/1993 | Holt et al. | |
|---|---|---|---|---|
| 7,800,367 | B2 | 9/2010 | Bhardwaj et al. | |
| 8,218,835 | B2 * | 7/2012 | Matsuda et al. | 382/128 |
| 2008/0287821 | A1 * | 11/2008 | Jung et al. | 600/544 |
| 2012/0277571 | A1 * | 11/2012 | Cho et al. | 600/410 |
| 2012/0322068 | A1 * | 12/2012 | Lee et al. | 435/6.11 |

OTHER PUBLICATIONS

Chung S et al., entitled "Whole Brain Voxel-wise Analysis of Single-Subject DTI by Permutation Testing," Neuroimage, Feb. 15, 2008; 39(4): 1693-1705.
Gold M M et al., entitled "Brain injury due to ventricular shunt placement delineated by diffusion tensor imaging (DTI) tractography," Neurologist, Jul. 2008; 14(4):252-4, Abstract Only.
Hulkower M B et al, entitled "A Decade of DTI in Traumatic Brain Injury: 10 Years and 100 Articles Later," AJNR Am J Neuroradiol, 2013, pp. 1-11 EPub Jan. 10, 2013.
Lipton M L et al., entitled "Multifocal white matter ultrastructural abnormalities in mild traumatic brain injury with cognitive disability: a voxel-wise analysis of diffusion tensor imaging," J Neurotrauma, Nov. 2008;25(11):1335-42.

(Continued)

*Primary Examiner* — Shefali Goradia
(74) *Attorney, Agent, or Firm* — Amster, Rothstein & Ebenstein LLP

(57) ABSTRACT

Methods and systems are disclosed for assessing a quantitative image volume from an individual subject comprising comparing the image from the subject to images from a control group of subjects using voxel-wise comparison. The methods allow detection of pathologies or lesions in the individual subject being assessed.

23 Claims, 7 Drawing Sheets

(56) References Cited

OTHER PUBLICATIONS

Lipton M L et al., entitled "Robust detection of traumatic axonal injury in individual mild traumatic brain injury patients: intersubject variation, change over time and bidirecitonal changes in anisotropy," Brain Imaging Behav, Jun. 2012;6 (2):329-42, Abstract Only.

Lipton M L et al., entitled "Diffusion-Tensor Imaging Implicates Prefrontal Axonal Injury in Executive Function Impairment Following Very Mild Traumatic Brain Injury," Radiology, vol. 252, No. 3, Sep. 2009, 816-824.

Lo C et al., entitled "Diffusion tensor imaging abnormalities in patients with mild traumatic brain injury and neurocognitive impairment," J Comput Assist Tomogr, Mar.-Apr. 2009;33(2):293-7, Abstract Only.

Mackay M et al., entitled "Differences in Regional Brain Activation Patterns Assessed by Functional Magnetic Resonance Imaging in Patients with Systemic Lupus Erythematosus Stratified by Disease Duration," Mol Med 17 (11-12) 1349-1356, Nov.-Dec. 2011.

Rosenbaum S B et al., entitled "Embracing chaos: the scope and importance of clinical and pathological heterogeneity in mTBI," Brain Imaging Behav, Jun. 2012;6(2):255-82, Abstract Only.

Rutgers D R et al., entitled "White Matter Abnormalities in Mild Traumatic Brain Injury: A Diffusion Tensor Imaging Study," AJNR Am J Neuroradiol 29:514-19, Mar. 2008.

Rutgers D R et al., entitled "Diffusion Tensor Imaging Characteristics of the Corpus Callosum in Mild, Moderate, and Severe Traumatic Brain Injury," AJNR Am J Neuroraiol 29:1730-35, Oct. 2008.

Viviani R et al., entitled "The bootstrap and cross-validation in neuroimaging applications: estimation of the distribution of extrema of random fields for single volume tests, with an application to ADC maps," Hum Brain Mapp., Oct. 2007;28(10): 1075-88.

Hulkower M B et al., entitled Personalized assessment of white matter injury based on diffusion tensor imaging (DTI) predicts cognitive performance in subacute mild traumatic brain injury (mTBI). Radiological Society of North America 2011 Scientific Assembly and Annual Meeting, Chicago, IL 2011, 1 page.

Hulkower M B et al., entitled Personalized Analysis of Diffusion Tensor Imaging Differentially Predicts Cognitive Performance in Subacute Mild Traumatic Brain Injury, 63rd Annual Meeting of the American Academy of Neurology. Honolulu, HI 2011, Poster.

Kim N. et al., entitled Robust Detection of White Matter Injury in Individual Patients After Mild Traumatic Brain Injury, ISMRM 19th Annual Meeting and Exhibition. Montreal, Canada 2011, Abstract and poster.

Lipton M L et al., entitled "Spatial variability of white matter pathology in mTBI demands a personalized approach to injury detection," Society for Neuroscience Annual Meeting. Washington, D.C. 2011, Abstract.

Singh M et al., entitled "Novel diffusion tensor imaging methodology to detect and quantify injured regions and affected brain pathways in traumatic brain injury," Magnetic Resonance Imaging 28 (2010) 22-40.

\* cited by examiner

METHODS FOR QUANTITATIVE ASSESSMENT OF VOLUMETRIC IMAGE FROM A SUBJECT AND USES THEROF

CROSS-REFERENCE TO RELATED APPLICATION

This application claims priority of U.S. Provisional Patent Application No. 61/604,167, filed on Feb. 28, 2012, the content of which is herein incorporated by reference.

FIELD OF THE INVENTION

The invention relates to systems and methods for assessing a quantitative volumetric image from an individual subject comprising comparing the image from the subject to images from a control group of subjects using voxel-wise comparison. The methods allow detection of pathologies or lesions in the individual subject being assessed, which may not be detectable by visual inspection of the images.

BACKGROUND OF THE INVENTION

Throughout this application various publications are referred to in parentheses. Full citations for these references may be found at the end of each section of Experimental Details. The disclosures of these publications are hereby incorporated by reference in their entireties into the subject application to more fully describe the art to which the subject application pertains.

Group-wise analyses of imaging have demonstrated evidence of injuries or pathologies associated with adverse clinical outcomes. Although the injury or pathology is likely to have a unique spatial pattern in each patient, group analyses implicitly assume that location of injury will be the same across patients.

Diffusion Tensor Imaging (DTI), for example, reveals white matter abnormalities in mild traumatic brain injury (mTBI), consistent with traumatic axonal injury (TAI), the presumptive pathologic substrate of adverse clinical outcomes after TBI (e.g., 1-9). Analyses comparing groups of mTBI patients and controls, employed almost universally in mTBI research, implicitly assume location of injury will be the same across subjects. This approach is inherently insensitive to intersubject variation in location of pathology, a highly questionable assumption, given the wide variation in mechanism of injury and patient characteristics (10, 11). Furthermore, clinical use of DTI requires assessment of individual patients. An approach to identifying loci of brain injury in individual mTBI patients is needed to fully understand the nature and extent of mTBI pathology toward personalizing and improving clinical practice.

Few studies have assessed DTI in individuals (4, 8, 12, 13). Viviani, et al. used cross-validation, a resampling technique, to estimate the distribution of extreme values across the whole brain in stroke and glioblastoma (12). They proposed empirical and calibrated thresholds, based on the Family-Wise Error Rate (FWER). FWER for control of Type-I error rate in neuroimaging data may be overly conservative, however (14). Singh, et al. employed a "one vs. many" T-test, comparing TBI patients to a control group, utilizing a priori thresholds (individual voxel and cluster level), but not reporting validation or effectiveness testing of the thresholds (8). The "one vs. many" T-test approach has also been applied to chronic mTBI (4). Importantly, none of the published studies included validation to address efficacy or clinical utility of DTI as a diagnostic test.

At present, no method is available that allows quantitative detection of imaging abnormalities on a voxelwise basis in individual patients. The imaging methods themselves exist and are approved for human use, but are not utilized because no methods exist to extract meaningful information from the images. The ready availability of such an approach would open the door to quantitative imaging in clinical use. The present invention addresses the need for a personalized approach for detecting pathology or injury in individual patients, which could detect inter-individual differences and be applied in the clinical setting, where patients must be assessed as individuals.

SUMMARY OF THE INVENTION

The present invention provides methods for quantitatively assessing an image volume from a subject comprising: obtaining from the subject a quantitative image volume that is represented as voxels; and comparing voxels from the image from the subject being assessed with corresponding voxels from a database of images from a control group of subjects, so as to thereby assess whether, and if so at which voxels, or not the image from the subject being assessed differs from the images from the control group.

The invention also provides a system for quantitatively assessing an image volume from a subject comprising one or more processors, a memory unit, and a computer-readable medium including computer-readable code that is read by the one or more processors to perform a method comprising the steps of: obtaining a quantitative image volume from a subject to be assessed that is represented as voxels; and comparing voxels from the image from the subject being assessed with corresponding voxels from a computer database of images from a control group of subjects, so as to thereby assess whether or not the image from the subject being assessed differs from the images from the control group.

of Z-scores from the whole white matter voxels. Bootstrap SD estimates based on a reference control group were produced by the procedure with B=2000. Lower bound of estimated bootstrap SD estimates is 1.

Figure 7:
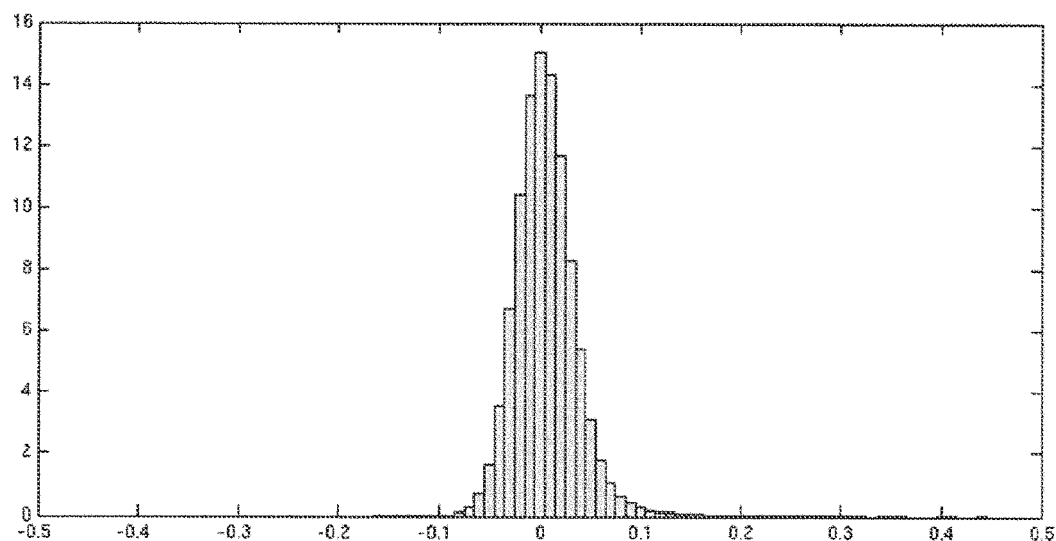

FIG. 7. Histogram of the mean of resampled Z-scores at each voxel, based on the bootstrap procedure. The histogram is approximately centered at zero with a narrow width (0.1). Based on this result, bias of Z-scores will be negligible.

DETAILED DESCRIPTION OF THE INVENTION

The invention provides a method for quantitatively assessing an image volume from a subject comprising:

obtaining from the subject a quantitative image volume that is represented as voxels;

inputting the image to a computer;

and using the computer to compare voxels from the image from the subject being assessed with corresponding voxels from a computer database of images from a control group of subjects, so as to thereby assess whether or not the image from the subject being assessed differs from the images from the control group, and if so at which voxels.

The method can comprise receiving by a computer a quantitative image volume that is represented as voxels; receiving by a computer images from a control group of subjects that are represented as voxels; and comparing using a computer voxels from the image from the subject being assessed with corresponding voxels from images from a control group of subjects, so as to thereby assess whether or not the image from the subject being assessed differs from the images from the control group, and if so at which voxels.

A voxel is a data point on a regular grid in three dimensional space. A voxel, i.e., a volumetric pixel, is analogous to a pixel, which represents two dimensional image data. The data point can consist of a single piece of data or multiple pieces of data. The method can be used to compare any quantitative imaging parameter such as, for example, fractional anisotropy, or axial, radial or mean diffusivity, as well as other quantitative imaging parameters, such as for example T1, T2, T2*, proton density, blood flow, blood volume, transit time or permeability. Anisotropy is the property of being directionally dependent, as opposed to isotropy, which implies identical properties in all directions. Fractional anisotropy (FA) is a scalar value between zero and one that describes the degree of anisotropy of a diffusion process. A value of zero means that diffusion is isotropic. A value of one means that diffusion occurs only in one direction. FA is a measure that is often used in diffusion tensor imaging (DTI).

The image can be obtained by any cross-sectional imaging means, such as, for example, magnetic resonance imaging (MRI), computerized tomography (CT) or ultrasound. Non-limiting examples of MRI include, for example, diffusion MRI, diffusion tensor imaging (DTI), diffusion-weighted imaging (DWI), Diffusion Spectrum Imaging (DSI), High Angular Resolution Diffusion Imaging (HARDI), other diffusion MRI methods, magnetization transfer MRI, quantitative T1, T2, T2*, T1rho or proton density MRI, magnetic resonance gated intracranial CSF dynamics (MR-GILD), magnetic resonance perfusion imaging, dynamic contrast enhanced MRI, dynamic susceptibility contrast MRI, arterial spin labeling MRI and magnetic resonance spectroscopy. For example, images can be obtained using DTI, and FA can be compared between the subject being assessed and the control group.

The image used from the subject being assessed is the same type of image (e.g., MRI, CT or ultrasound) as from the control group of subjects used in the comparison. For example, an image obtained by DTI from the subject being assessed will be compared with images obtained by DTI from the control group. Preferably, the image from the subject being assessed and from the control group are obtained using the same imaging device, e.g., using the same MRI scanner.

The control group can be, for example, a group of normal subjects or a group of subjects who have a known pathology or lesion. Preferably, the control group includes 10-40 subjects. More preferably, the control group includes at least 20 subjects, such as, e.g., 20-30 or 20-40 subjects.

Preferably, a bootstrap resampling method is used to estimate the control group variance. In a preferred embodiment, an EZ-score is computed for individual voxels. As described herein, the EZ-score at voxel (i) is then given in Equation (1)

$$EZ_i = \frac{Z_i}{\hat{\sigma}_i^B} \quad (1)$$

where $\hat{\sigma}_i^B$ is the bootstrap SD estimate at voxel i.

If the control group is a group of normal subjects, differences between the subject being assessed and the control group can indicate that the subject has a pathology or lesion. The pathology or lesion can be a microscopic pathology or lesion.

For example, diffusion tensor imaging can be used to detect areas of abnormal fractional anisotropy in a subject's brain that are indicative of mild traumatic brain injury. Other pathologies or lesions that can be assessed include, for example, tumors, infections, demyelinating disease, degenerative disease, ischemia, and pathologies and lesions resulting from toxic exposures.

The present method can be applied to imaging an entire subject or a portion of a subject, including, for example, head, neck, thorax, breast, abdomen, limb, arm, forearm, upper arm, leg, lower leg, upper leg, elbow, hip, knee, ankle and/or foot, or an internal organ, such as, for example, brain, lung, heart, stomach, intestine, colon, liver, pancreas or kidney. For example, a voxel by voxel analysis can be made across the entire brain. The subject can be a human. The subject can also be, for example, a non-human animal such as, e.g., a mouse, rat, cat, dog, horse, cow, sheep, cattle or primate.

The methods can further comprise imaging the subject being assessed to obtain a quantitative image volume that is represented as voxels, and/or imaging one or more subjects from the control group.

The invention also provides a system for quantitatively assessing an image volume from a subject comprising one or more processors, a memory unit, and a computer-readable medium including computer-readable code that is read by the one or more processors to perform a method comprising the steps of: obtaining a quantitative image volume from a subject to be assessed that is represented as voxels; and comparing voxels from the image from the subject being assessed with corresponding voxels from a computer database of images from a control group of subjects, so as to thereby assess whether or not the image from the subject being assessed differs from the images from the control group, and if so at which voxels.

This invention will be better understood from the Experimental Details that follow. However, one skilled in the art will readily appreciate that the specific methods and results discussed are merely illustrative of the invention as described more fully in the claims that follow thereafter.

EXPERIMENTAL DETAILS

I. Methods and Validation
Introduction and Summary

The present invention is herein exemplified as applied to a robust detection of traumatic axonal injury in individual mild traumatic brain injury patients. This study developed, implemented and validated an approach, "Enhanced Z-score Microstructural Assessment of Pathology" (EZ-MAP), an aspect of the present invention, for detection of regional abnormalities of fractional anisotropy (FA) in individual mTBI patients.

Thirty-four mTBI patients and 42 normal subjects underwent 3.0 Tesla DTI. Enhanced Z-score Microstructural Assessment of Pathology (EZ-MAP), a voxelwise Z-score assessment optimized for assessment of individual patients, was applied to each patient's fractional anisotropy (FA) images and tested for its ability to discriminate patients from controls and its robustness to alteration of the composition of the control group. Receiver Operating Characteristic (ROC) analyses were used to define optimal thresholds (voxel-level significance and spatial extent) for reliable and robust detection of mTBI pathology.

EZ-MAP showed moderate specificity (76%) and sensitivity (65%) for discriminating mTBI patients from controls in terms of the total number of abnormal white matter voxels detected. Results were similar when patients were assessed against unique control groups. Stricter thresholds yield very high specificity (>90%), although at lower sensitivity. EZ-MAP consistently identifies white matter pathology in individual mTBI patients regardless of control group composition.

Materials and Methods
Patient and Control Subjects

After Institutional Review Board (IRB) approval, Health Insurance Portability and Accountability Act (HIPAA) compliance and written informed consent, subjects were prospectively enrolled, distinct from clinical care. Thirty-four mTBI patients from one hospital emergency department met inclusion/exclusion criteria (Table 1) and were enrolled between August 2006 and May 2010. The mild head injuries were due to motor vehicle accidents, falls or assault. Forty-two control subjects with no history of head injury were recruited through advertisements. Because application of the methods to clinical settings will require use of ready control data to assess a new patient, it was decided not to match controls one-to-one with patients. However, controls were chosen with an even distribution of age, gender and educational attainment that fully brackets the range of the patients; no patient age or educational attainment exceeds all controls at either extreme. For the purpose of validation experiments, the control group was subdivided into two similar subgroups of 21 controls each. Adjustments were made for the potential affects of age, gender and education using a linear regression model estimated from a subgroup of 21 controls. FA images used in subsequent analyses were first adjusted by applying regression coefficients to voxels where effects were significant. Linear regression analysis of the effects of age, gender, and education on FA was performed, within one group of 21 normal control subjects. Regression coefficients thus determined were applied to FA images of all control subjects and patients, but only at locations where effects on individual voxels were significant at $p<0.05$ and where more than 100 significant voxels formed a contiguous cluster. This approach was taken because application of the regression model to all regions will only add noise to the Gaussian Random Field (GRF), diminishing sensitivity (15).

Imaging Parameters and Image Preprocessing:
Neuroradiologic Image Assessment:

Two American Board of Radiology certified neuroradiologists independently reviewed magnetic resonance (MR) images of all subjects (patients and controls) in random sequence during a single session, blind to clinical information and group membership (patient or control).

Calculation of Diffusion Parameter Images:

The 33 diffusion-weighted image sets (32 diffusion sensitizing directions and the $b=0$ sec/mm$^2$ image) were corrected for head motion and eddy current effects using an affine registration algorithm. FA was derived from DTI at each voxel using the FMRIB Diffusion Toolbox (37).

Quantitative Image Analysis
Skull Stripping:

Non-brain voxels were removed from the MP-RAGE and turbo spin-echo images using FMRIB-FSL software (38). Each brain volume was inspected section-by-section, and residual non-brain voxels were removed manually.

Echo-Planar Imaging Distortion Correction:

Turbo spin-echo images were acquired with the same section thickness, position and orientation as DTI. Distortion correction was accomplished using a nonlinear deformation algorithm to match each echo-planar image to the corresponding turbo spin-echo volumes (39).

Intermediate Rigid-Body Registration:

Each subject's turbo spin-echo images were registered to their three-dimensional MP-RAGE volume using the Automated Registration Toolbox three-dimensional (40) rigid-body approach (41).

Registration to Standard Space:

The nonlinear registration module of the Automated Registration Toolbox was used to register each subject's three-dimensional MP-RAGE volume to a standard T1-weighted template (Montreal Neurological Institute atlas; MNI) (42).

Transformation of DTI to Standard Space:

Using the Automated Registration Toolbox, distortion correction, intermediate rigid-body registration, and standard space registration were applied to the calculated FA maps in a single resectioning operation. Final cubic voxel size was 1 mm$^3$, masked to exclude non-brain voxels from the analysis.

Segmentation:

The fast automated segmentation tool in the FMRIB-FSL package (38) was used to generate a white matter mask for the three-dimensional MP-RAGE template brain images and restrict subsequent statistical analysis of FA to white matter voxels.

Segmentation of White Matter Regions:

The Johns Hopkins University (JHU) white matter atlas (43) was adapted for segmentation of white matter subregions. Using FLIRT from the FMRIB-FSL package (38), the T1-weighted JHU white matter atlas was registered to the T1-weighted template. The resulting transformation matrix was applied to the white matter segmentation volume of the JHU white matter atlas to bring it into registration with the MNI template used for DTI analysis.

Enhanced Z-Score (EZ)

The Z-score was computed at each voxel within a subject's FA volume. Reference values (mean and Standard Deviation (SD)) for the Z-score computation were computed from the control group. Ideally, the reference mean and SD used to compute any Z-score should be derived from the entire reference population from which the control group is derived. In the present case, the population includes all normal subjects within the demographic parameters defined above, from which subsets were extracted as control samples. In practice, the limited size of a control group relative to the size of the population may mean that the control group does not accurately represent the full population from which it was selected. Therefore, the control group mean and SD may change with the composition of the control group, causing a bias (away from zero) and adding variance to the Z-score. Since the control group mean converges to the population mean at a faster rate than SD, additional variance is likely to be the most important factor contributing to variation of Z-scores across different control subgroups. Z-scores calculated as above may have a variance greater than 1 as shown below and demonstrated in FIG. 6. Inferences based on Z-scores computed using only the control group variance might thus yield an unacceptably high rate of false positive results. Uniform application of higher Z-score thresholds to all voxels can be adopted in an effort to minimize false positive results, but may result in decreased detection power. The potential excess variance in the Z-score was accounted for by employing a bootstrap procedure as described below. EZ at voxel (i) is then given in Equation (1).

$$EZ_i = \frac{Z_i}{\hat{\sigma}_i^B} \quad (1)$$

where $\hat{\sigma}_i^B$ is the bootstrap SD estimate at voxel i from the proposed bootstrap procedure.

Variance of Z-Score

Variance of Z-score, calculated with sample mean and SD from a group of controls, is greater than 1 due to different composition of the control group as proved below.

$$\text{Proof of } \operatorname{Var}\left(\frac{Y-m}{s}\right) \geq 1. \quad (A.1)$$

$$\operatorname{Var}\left(\frac{Y-m}{s}\right) = \operatorname{Var}\left(E\left(\frac{Y-m}{s} \mid Y=y\right)\right) + E\left(\operatorname{Var}\left(\frac{Y-m}{s} \mid Y=y\right)\right) \geq \operatorname{Var}\left(E\left(\frac{Y-m}{s} \mid Y=y\right)\right),$$

where m and s are mean and SD of n observations, respectively. Since sample mean and SD are independent under Gaussian distribution, $$E\left(\frac{Y-m}{s} \mid Y=y\right) = E(y-m)E\left(\frac{1}{s}\right) = k_n \frac{y-\mu}{\sigma} \text{ with} \quad (A.2)$$

$$k_n = \frac{\sqrt{n-1}\,\Gamma\left(\frac{n-2}{2}\right)2^{\frac{n-2}{2}}}{\Gamma\left(\frac{n-1}{2}\right)2^{\frac{n-1}{2}}} \, (n \geq 2),$$

and the underlying Gaussian distribution ($\mu$, $\sigma^2$).

If y is sampled from the underlying Gaussian distribution ($\mu$, $\sigma^2$), $$\operatorname{Var}\left(E\left(\frac{Y-m}{s} \mid Y=y\right)\right) = \operatorname{Var}\left(k_n \frac{y-\mu}{\sigma}\right) = k_n^2. \quad (A.3)$$

Since $k_n \geq 1$ for $n \geq 3$, $$\operatorname{Var}\left(\frac{Y-m}{s}\right) \geq 1 \, (n \geq 3). \quad (A.4)$$

Bootstrap Procedure for Estimation of the SD for Use in Enhanced Z-Scores

Bootstrap procedure for estimation of the SD for use in Enhanced Z-scores:

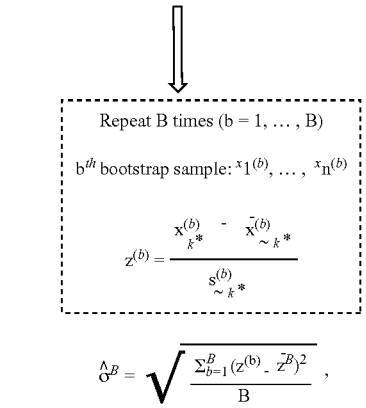

where $\bar{x}_{-k*}^{(b)}$ and $\bar{s}_{-k*}^{(b)}$ are mean and SD of $b^{th}$ bootstrap sample $(x_j^{(b)} | j \neq k*, (1 \leq j, k* \leq n))$ respectively, and k* is an integer predetermined (k*=n and B=2,000 for this study). $\bar{z}^B$ is the mean of $z^{(b)}$ (b=1, ..., B).

Threshold Optimization

Figure 1:
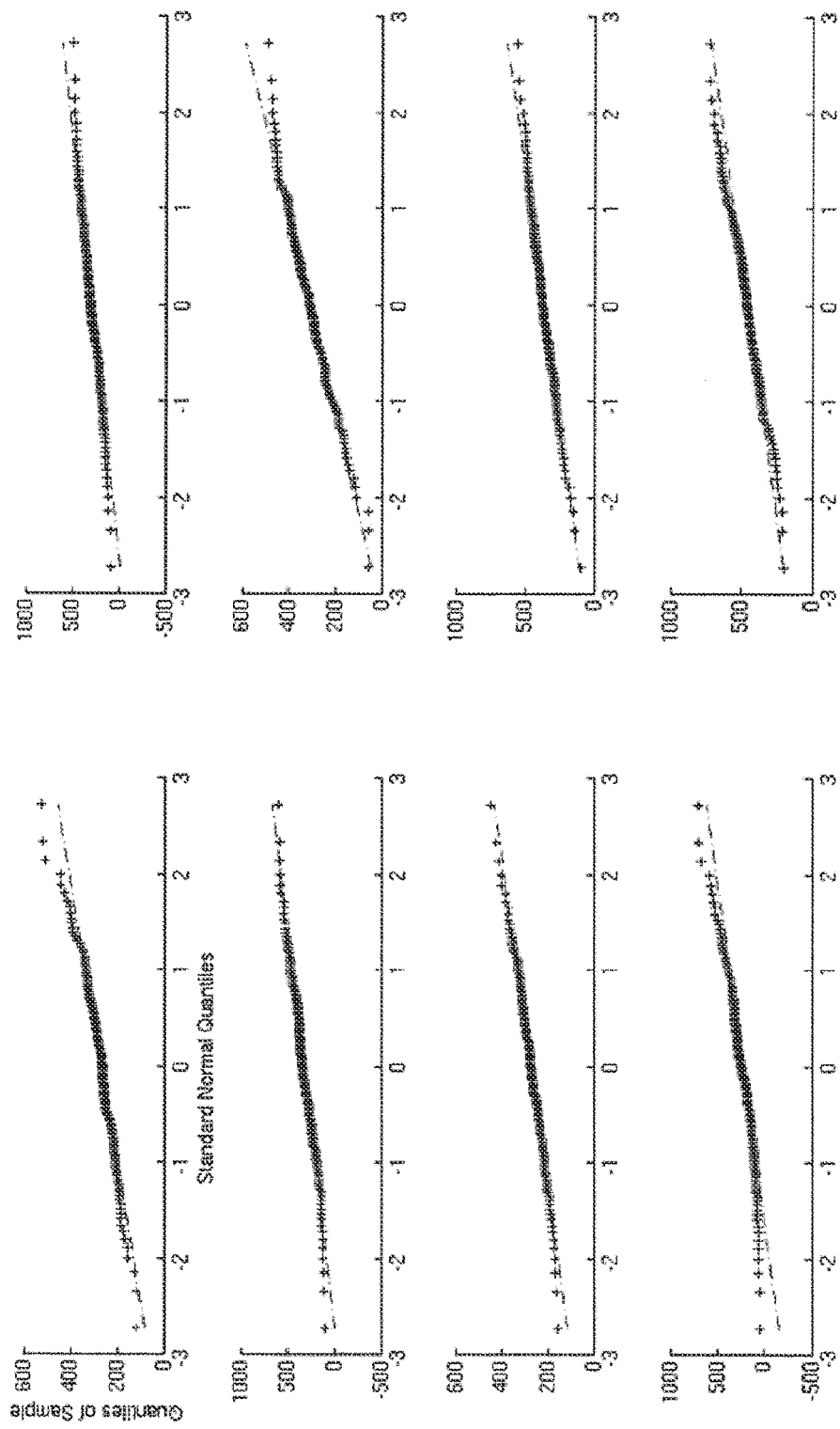
FIG. 1. Conformance of the distribution of fractional anisotropy (FA) data in the control group to Gaussian assumption was explored using quantile-quantile (Q-Q) plots. Each Q-Q plot was drawn with a collection of adjusted FA values (crosses) from 42 control subjects at a randomly chosen voxel. Minor lack of fit to the Gaussian assumption of FA (dashed line) across control subjects at the extreme tails of some distributions is consistent with the relatively small sample size. Note that expected FA values are below zero in some cases (e.g., bottom, left). This is artifactual, because FA values can take only positive values and cannot therefore exactly converge to the expected distribution.

Significance was initially determined by assessing the Tail Probability at a voxel i ($TP_i$) of the EZ from a standard Gaussian distribution (Equation (2)). This is based on an assumption that the FA value of the control population at each voxel follows a Gaussian distribution. The assumption of a Gaussian distribution was explored using Quantile-Quantile (Q-Q) plots of covariate-adjusted FA values from 8 randomly selected voxels in 42 control subjects. Random selection was achieved using the MATLAB (Mathworks, Natick, Mass.)

random number generator to select voxel coordinates. The Q-Q plots (FIG. 1) indicate that distribution of FA values of the control subjects does not severely deviate from the Gaussian distribution. Thus, assuming a Gaussian distribution for FA values from control subjects is reasonable.

$$TP_i = Pr(|EZ_i|z_{\alpha_1/2}) \quad (2)$$

Two levels of thresholding were applied to identify significantly abnormal voxels. First, each voxel must meet a threshold ($\alpha_1$) for the $TP_i$ (Equation (2)) in order to be classified as abnormal. Second, the subset of these voxels that forms contiguous clusters meeting a size threshold ($\alpha_2$) is ultimately classified as abnormal. The threshold for cluster size was determined using GRF theory (15). Thresholds were tested both uncorrected and corrected for multiple comparisons.

Receiver operating characteristic (ROC) analysis is suited to the assessment of complex diagnostic methods, such as neuroimaging, where theoretical validation of all aspects of a diagnostic procedure may be impossible. ROC is particularly useful in this case because it allows simultaneous assessment of multiple threshold values, $\alpha_1$ and $\alpha_2$, which may have a complex relationship to classification power.

ROC analysis was used to test the utility of EZ for classification of subjects as patients or normals in terms of number of abnormal voxels detected. Maps of EZ were generated for each mTBI patient and for each of 21 normal controls. One control subgroup (n=21) was used as the reference group for computation of the EZ in each subject. The remaining control subgroup (n=21) provided the normal subjects used to test classification. Using a range of combinations of the two thresholds ($\alpha_1$ and $\alpha_2$), ROC analysis identified optimal levels of the two thresholds, where area under the ROC Curve (AUC) was maximal.

Robustness Measures

Robustness refers to similarity in thresholded EZ maps of the same patient, each made using mean and SD from one of two unique control groups. To evaluate robustness, the EZ for each patient was derived twice, each time using a unique subgroup (n=21) of controls to derive mean and SD. High robustness indicates that similar abnormalities will be detected when comparing a single individual to each of two unique reference groups. Two similarity measures were used to assess robustness for each subject: voxel-wise (SA) (44) and cluster-wise (SB) similarity. Formulae for computation of the similarity measure are given below. Average SA is an average, weighted by number of abnormal voxels detected in each subject, of the number of abnormal voxels occurring in the same location regardless of control group used. SB represents the ratio of clusters with more than 100 overlapping voxels. Average SB is an average, weighted by number of clusters detected in each subject, of the number of clusters with more than 100 overlapping voxels across subjects.

$$\text{Similarity } A_l(SA_l) = \frac{2n_v(I_l^1 \cap I_l^2)}{n_v(I_l^1) + n_v(I_l^2)} \quad (A.5)$$

$$\overline{SA} = \sum_{l=1}^{n} w_l^A SA_l \bigg/ \sum_{l=1}^{n} w_l^A, \text{ where} \quad (A.6)$$

$$w_l^A = (n_v(I_l^1) + n_v(I_l^2))/2.$$

$n_v(I_l^1 \cap I_l^2)$ is the number of overlapping voxels in two thresholded images ($I_l^m$, m=1, 2) of patient l; $n_v(I_l^m)$ is the number of abnormal voxels detected from $I_l^m$.

$$\text{Similarity } B_l(SB_l) = \frac{2n_c(I_l^1 \cap I_l^2)}{N_l^1 + N_l^2} \quad (A.7)$$

$$\overline{SB} = \sum_{l=1}^{n} w_l^B SB_l \bigg/ \sum_{l=1}^{n} w_l^B, \text{ where} \quad (A.8)$$

$$w_l^B = (N_l^1 + N_l^2)/2.$$

$n_c(I_l^1 \cap I_l^2)$ counts the number of overlapping clusters in two thresholded images ($I_l^1$, $I_l^2$), and is calculated by $$n_c(I_l^1 \cap I_l^2) = \frac{1}{2}\left(\sum_{j=1}^{N_l^1} \mathbf{1}\left(\sum_{j'=1}^{N_l^2} n_v(C_{j,l}^1 \cap C_{j',l}^2) \geq r\right) + \sum_{j'=1}^{N_l^2} \mathbf{1}\left(\sum_{j=1}^{N_l^1} n_v(C_{j,l}^1 \cap C_{j',l}^2) \geq r\right)\right),$$

where $N_l^1$ and $N_l^2$ are the number of clusters from $I_l^1$ and $I_l^2$, respectively; $C_{j,l}^m$ is the $j^{th}$ cluster of the $m^{th}$ (m=1,2) image ($I_l^m$) of the $l^{th}$ patient; $\mathbf{1}(\bullet)$ is indicator function of an event in parentheses; r is the threshold for overlap (r=100 in this study).

Results

Figure 2:
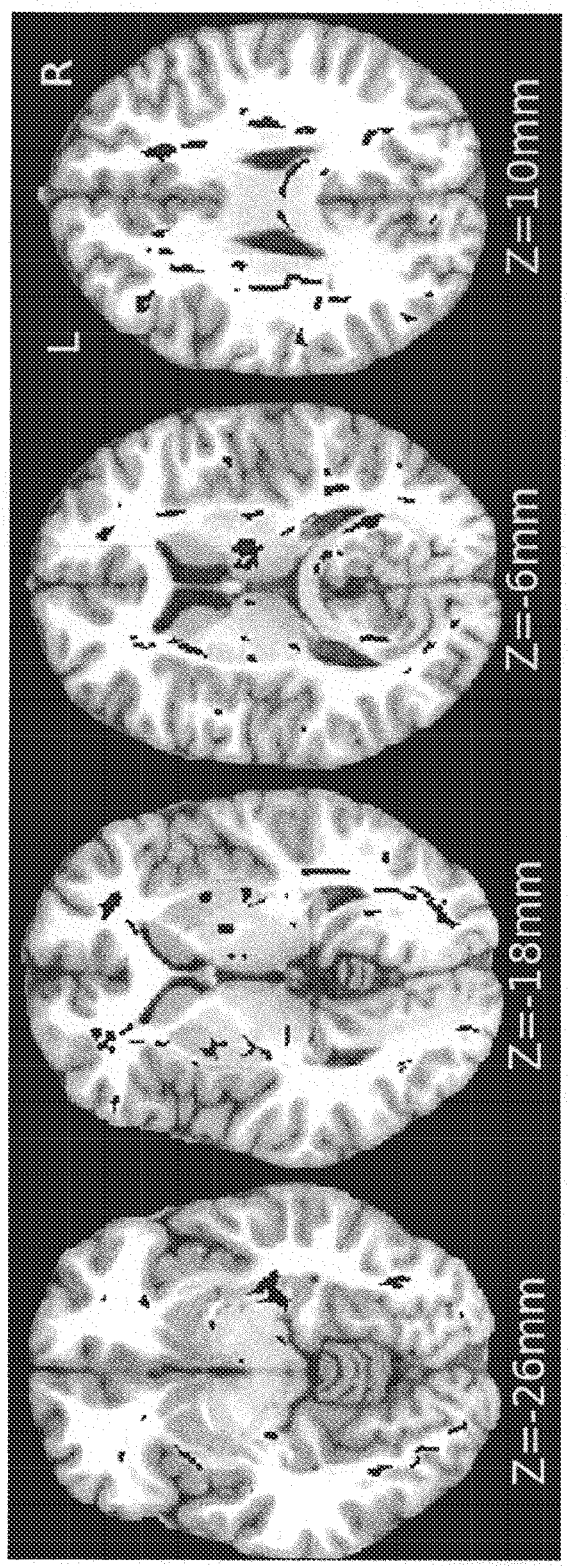
FIG. 2. White matter regions with significant demographic (age, gender, years of education) covariate effects (F (0.05, 3, 17)=3.2 and cluster size over 100 voxels). Example images are at Z=−26, −18, −6 and 10 mm (Montreal Neurological Institute (MNI) coordinates).

Characteristics of the patient and control samples (Table 2) show that the range of age, gender, and years of education of controls fully encompasses those of patients. Furthermore, no significant difference in age (T-test; p=0.289, 0.324) or gender distribution (Chi-squared test; p=0.864, 0.511) was found between each control group and the patient group. However, difference in years of education (T-test; p=0.005, 0.004) was significant. 27,290 white matter voxels (4.5% of total white matter volume) met significance criteria for the effects of demographic covariates, dominated by the effect of education. Four axial slices with significant effects of demographic covariates on FA are shown in FIG. 2.

Figures 3A, 3B, 3C:
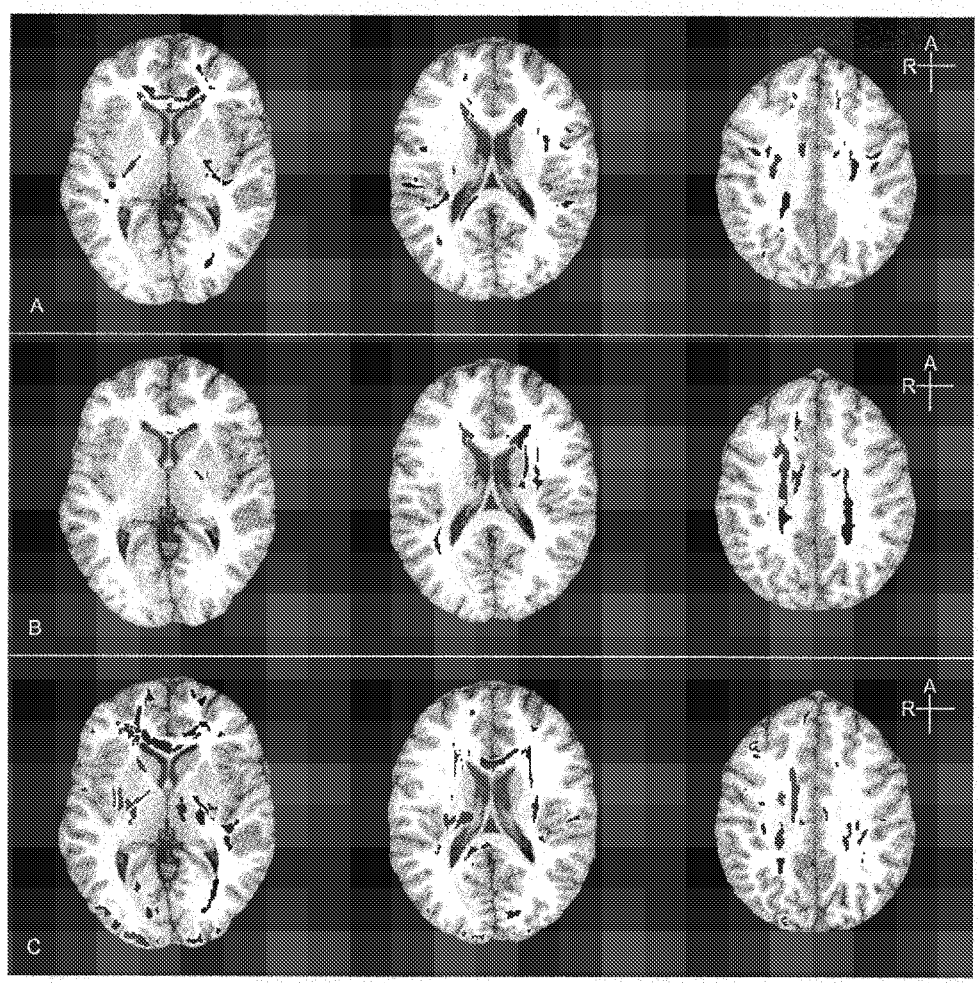
FIG. 3A-3C. Variation in the spatial distribution of FA abnormalities across patients. Three axial images in three patients (A, B, C) showing multiple areas of abnormally high and low FA in the acute post-injury period (A—3 days, B—6 days, C—9 days). Each patient shows multiple locations of abnormality, with variable lesion location across individuals.
Figure 4:
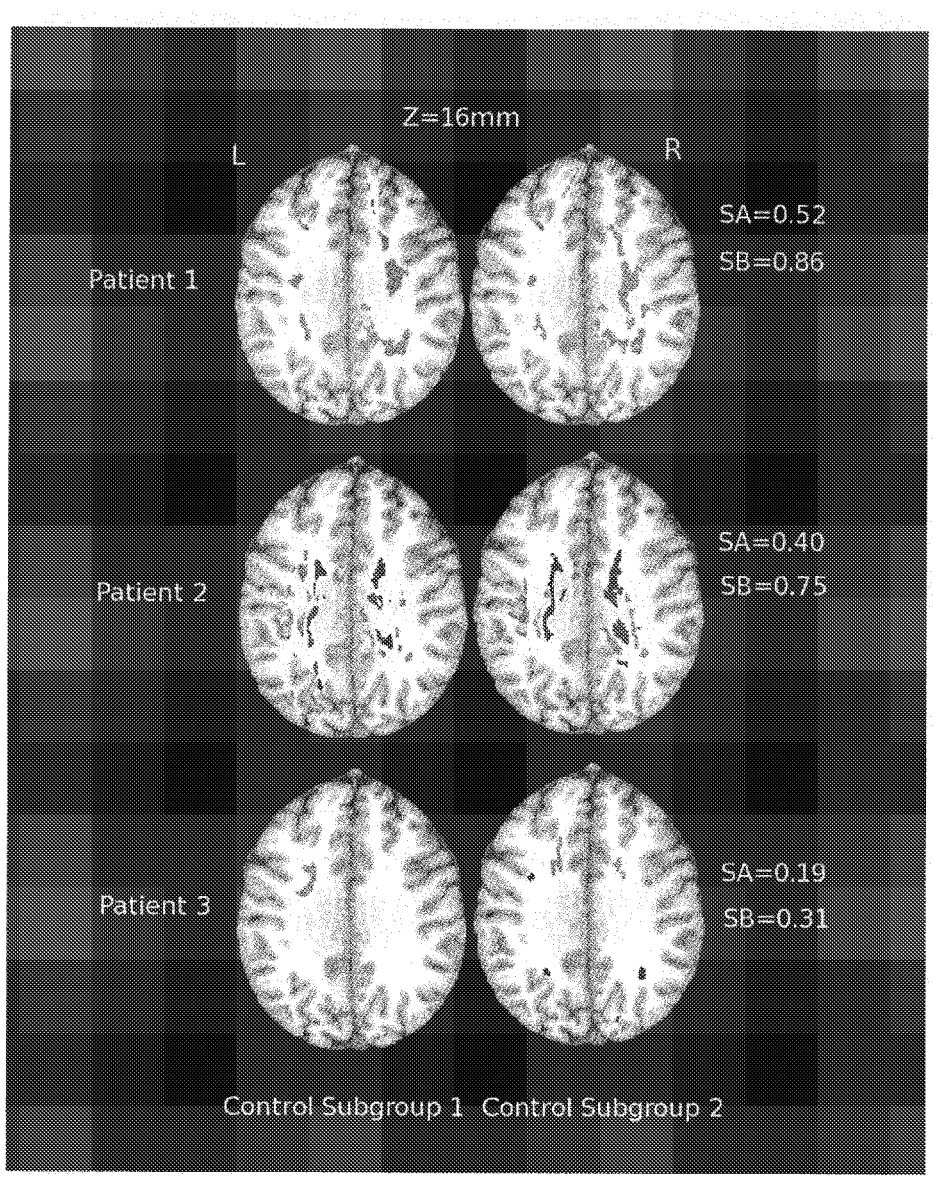
FIG. 4. Robustness in three mTBI patients. These axial images are each at Z=16 mm (MNI coordinates). Each row shows the same slice location in the same patient. Each column represents the result obtained with one of two unique control subgroups. Quantification of similarity (SA=voxel overlap %; SB=cluster overlap %) is shown at right. Note that the quantitative similarity refers to similarity across the whole brain volume. Thus, similarity evident within this single slice is only representative of overall brainwide similarity.

FIG. 3 shows example maps of abnormal FA from three different mTBI patients, demonstrating multiple areas of abnormally high and low FA with significant variation in the size and spatial distribution of FA abnormalities across patients. The determination of abnormality at this stage was defined using thresholds ($\alpha_1$=0.05 (2-tailed); $\alpha_2$=0.01 (corrected for multiple comparisons)) determined from ROC analysis (below). Robustness was measured for each patient by comparing two EZ statistical images, each computed using a different control group, for the same patient. Correspondence of both individual voxels and clusters was assessed, finding robustness of individual voxel determinations to be lower (55%) than that for clusters (75%) (Equations A.5-A.8 above). The average robustness of the EZ, measured across all patients, is shown in Table 3. Higher robustness was found at lower thresholds for $\alpha_1$ and higher thresholds for $\alpha_2$. Highest robustness was achieved at $\alpha_1$=0.05 (2-tailed) and $\alpha_2$=0.01 (corrected). FIG. 4 displays thresholded images from three example patients, demonstrating high, median, and low robustness, but an overall large degree of reproducibility.

Figure 5:
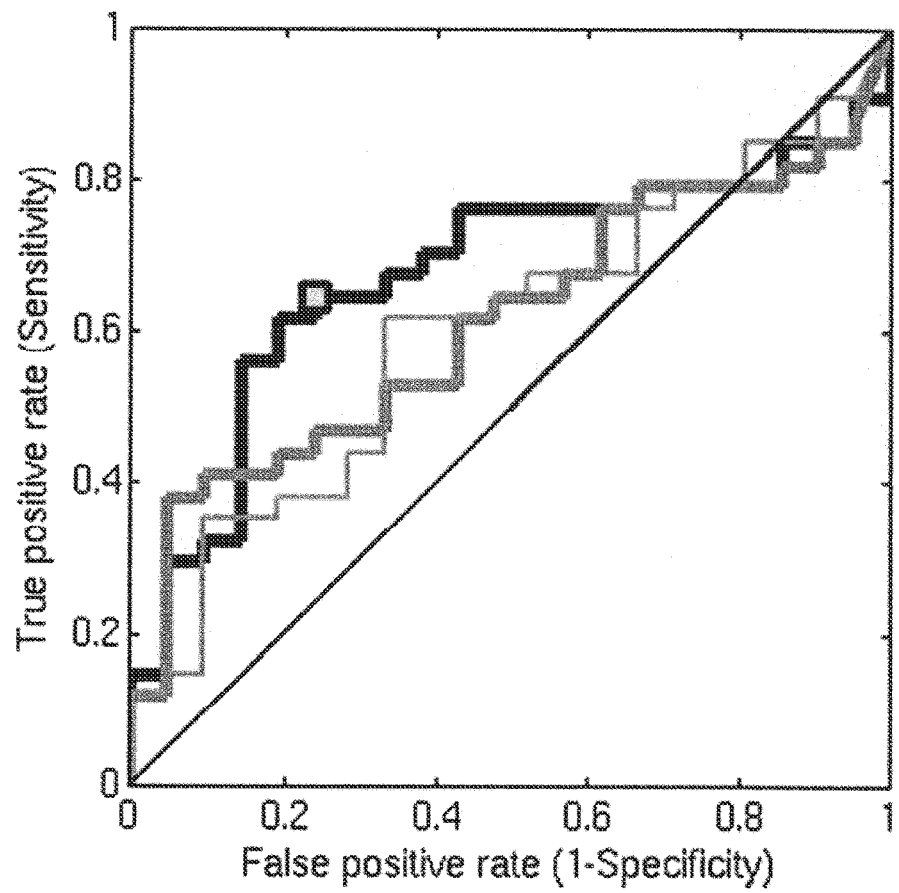
FIG. 5. Receiver operating characteristic (ROC) curves assessing number of white matter abnormal voxels. Enhanced Z-scores (EZs) were calculated at a voxel significance threshold $\alpha_1=0.05$ (2-sided) and spatial extent threshold $\alpha_2=0.01$ (corrected). The ROC curves reporting all abnormal voxels, abnormally low FA voxels and abnormally high FA voxels are shown. All abnormal FA was statistically significant discriminators between patients and controls based on area under the ROC curve (AUC). Although not statistically significant based on this assessment, low FA achieved high specificity. The diagonal line refers to NO discrimination. The square indicates the optimal sensitivity and specificity of the ROC curve with all abnormal voxels.

In assessing diagnostic utility in individual patients, three global metrics were initially investigated: (1) all abnormal white matter voxels across the whole brain, (2) all white matter voxels where FA was significantly higher than normal and (3) all white matter voxels where FA was significantly lower than normal. For this test, a subgroup of 21 control subjects was used as the reference group based upon which EZ maps were derived for each individual mTBI patient and for each control from the remaining subgroup of 21 controls. ROC plots for each metric were generated by applying a range of the two thresholds, $\alpha_1$ and $\alpha_2$ (FIG. 5). Total number of whole brain abnormal white matter voxels was an effective discriminator, reaching statistical significance in the ROC analysis. Somewhat surprisingly, total whole brain white matter voxels either with abnormally low or high FA did not reach statistical significance as discriminators, when considered separately. Table 4 shows AUC and p-values (Wilcox-Mann-Whitney test, 1-tailed) calculated at various levels of the two thresholds, $\alpha_1$ and $\alpha_2$. Greatest efficacy in making the discrimination between patients and controls, based on maximizing AUC, was found at lower thresholds for $\alpha_1$ and higher thresholds for $\alpha_2$. These threshold findings parallel those found in assessing robustness (above). Table 5 shows the sensitivity and specificity achieved when applying three different pairs of the two thresholds, $\alpha_1$ and $\alpha_2$. Applying a combination of the two thresholds where one is stricter and the other more liberal, achieved slightly better sensitivity than the use of two strict threshold values, but overall sensitivity and specificity were similar across the range of thresholds shown. Specificity and positive predictive value were generally higher than sensitivity and negative predictive value.

Since numerous prior studies of DTI in mTBI have consistently shown that regional FA measures differ between groups of mTBI patients and normals by 2-sample T-test, the patient (n=34) and control groups (n=21) were compared based on each global metric derived at the optimized thresholds ($\alpha_1$=0.05 (2-tailed); $\alpha_2$=0.01 (corrected for multiple comparisons)). Results of the 2-sample T-test are shown in Table 6. Overall, the total number of voxels with abnormally low FA was significantly different between patients and controls. All abnormal FA voxels (high and low) was somewhat more significantly different between groups. While this indicates that the additional consideration of abnormally high FA may add to diagnostic power, total abnormally high FA voxels was not significantly different, when assessed alone.

Patient assessments using the thresholds described above provide a means for discriminating patients from controls based on the number of abnormal white matter voxels. At these thresholds, however, some voxels meeting the criteria for abnormality are found in controls. An assessment was made if, at some threshold level, abnormalities would still be detectable in patients, but only rarely, if at all, in controls. Three higher thresholds were explored for $\alpha_1$ (0.01, 0.005, 0.001), all with $\alpha_2$=0.01 (corrected). As shown in Table 7, the stricter thresholds result in substantially higher specificity, with concomitant loss of sensitivity. This approach will thus misclassify some mTBI patients as normal, but if very high diagnostic certainty is required, it has the advantage of misclassifying only one out of 42 controls as a patient.

Discussion

Individualized assessments are needed to guide personalized therapeutic interventions (16-21). Personalized medicine is generally understood to encompass genotype-tailored treatment (16-20), but other unique manifestations of disease demand individualized diagnostic and therapeutic approaches. Personalized assessments are especially relevant to TBI, where the nature of the injury and its pathologic manifestations, will be unique in each individual (10). Nonetheless, the analytic methods described herein could be generalized to the assessment of many brain diseases. Individualized assessment of DTI has been reported in only a few studies of TBI, which applied group-wise methods to individuals (4, 6, 8, 22). Importantly, none of these studies included specific validation of the robustness of their approach across different control samples.

Several important considerations were carefully addressed in the implementation and validation of the present approach. First, any study must in practice employ a control group that is a small subset of the population against which determinations of abnormality are to be inferred. This sampling limitation may lead to underestimation of variance in Z-scores and consequent erroneous inferences. EZ-MAP, not previously applied to the assessment of DTI data or individual subject assessments, accounts for this potential additional variance by bootstrap, a nonparametric method which resamples the Z-score while varying the reference standard deviation (by resampling the composition of the control group). An alternative bootstrap method would first resample the deviation of an individual FA from the mean FA obtained from a control group arriving at a new bootstrap SD quantity, which would then be used in computing the individual patient Z-scores. The former approach was used because it yields a more robust and stable approximation of the true distribution (23, 24). Bias (variability of the control group mean based on its composition) was not incorporated in calculating the EZ, assuming that bias would be very close to zero. The narrow distribution (particularly around zero) of the mean of resampled Z-scores at each voxel confirms the validity of this assumption (FIG. 7). Reasonably similar results were obtained when two unique control subgroups were each used to assess the same patients. Second, differences between the patient and control groups were carefully assessed and accounted for to minimize the chance that covariates such as age, gender and education would be detected as real effects. Notably, significant effects of age, gender and education were modest in magnitude and spatial extent. The findings suggest that, within the demographic range of the sample, the actual impact of these factors is minor. Third, robustness and diagnostic utility were systematically and quantitatively validated using standard approaches for the assessment of diagnostic tests.

EZ-MAP discriminated mTBI patients from normals, showing statistical significance on assessment of area under the ROC curve and significant differences between patients and controls in the number of abnormal voxels detected. Nonetheless, at the optimal thresholds identified by the analyses, few areas of "abnormality" could still be detected when individual normal subjects were assessed using EZ-MAP. Utilizing stricter thresholds to determine abnormality greatly improved specificity (90%), but at the expense of sensitivity (30%). One interpretation of these findings is that FA has limited sensitivity, but quite reasonable specificity for the diagnosis of mTBI. Alternatively, FA might be an excellent classifier for foci of more severe injury, but not discriminate abnormalities if effects are diluted by the inclusion of less severe injury regions (i.e., whole brain FA assessment).

Several potential limitations of this study should be considered. First, it is important to critically assess the likelihood that the effects seen in mTBI patients are due to mTBI rather than some other white matter abnormality. Although, strictly speaking, it would never be possible to explicitly accept a null hypothesis that the patient and control subjects do not differ other than due to mTBI, great lengths were taken to ensure, to the maximum extent possible, that differences between patients and controls are reasonably attributable to mTBI. The mTBI patients in this study were carefully screened to exclude pre-injury medical, neurological or psychiatric disorders, including substance use, which could possibly cause white matter pathology. In addition to adjusting for age, patients at extremes of the lifespan were excluded, where developmental or senescent changes may affect FA. Although a significant difference in education was found between patients and controls, only minimal effects were found on FA, which were adjusted for in the analyses. Abnormal findings occurred in areas expected to be affected in TBI (1, 3-10, 22, 25-36) and are consistent with numerous prior studies of DTI in TBI (e.g., 4, 6-8, 27, 29-31). A Gaussian distribution of FA was assumed across control subjects. This assumption proved reasonable in the present sample. Finally, an important limitation is that these results are based on carefully collected and processed uniform data for both controls and patients.

TABLE 1

Inclusion and Exclusion criteria for patients and normal subjects

| | Inclusion Criteria | Exclusion Criteria |
|---|---|---|
| Patients | 1. 18-67 years of age<br>2. Emergency department diagnosis of concussion within 2 weeks<br>3. GCS = 13-15 LOC <20 minutes<br>4. Posttraumatic amnesia <24 hours<br>5. No focal neurologic deficit<br>6. English or Spanish proficiency | 1. Prior head injury<br>2. Hospitalization due to the injury<br>3. Neurodevelopmental or neurological disorder<br>4. Major psychiatric disorder<br>5. Illicit drug use within 30 days<br>6. Skull fracture or abnormal CT |
| Normal subjects | 1. 18-67 years of age | |

CT = Computerized Tomography;
GCS = Glasgow Coma Scale.

TABLE 2

Distribution of demographic variables across mTBI patients and control subjects

| | | | Control subjects | | |
|---|---|---|---|---|---|
| | | Total | Control Group 1 | Control Group 2 | Patients |
| Total | N | 42 | 21 | 21 | 34 |
| AGE | 19-29 | 11 | 5 | 6 | 13 |
| | 30-39 | 12 | 4 | 4 | 13 |
| | 40-49 | 8 | 2 | 4 | 5 |
| | 50-59 | 9 | 20 | 67 | 5 |
| | 60+ | 2 | 38.4 | — | 3 |
| | Min | 20 | | 21 | 19 |
| | Max | 67 | | 59 | 64 |
| | Mean | 38.3 | | 38.2 | 34.9 |
| Education | <10 | 1 | 1 | — | 5 |
| | 11-13 | 10 | 4 | 6 | 12 |
| | 14-17 | 16 | 8 | 8 | 14 |
| | 18-20 | 7 | 4 | 3 | 3 |
| | 21-23 | 4 | 2 | 2 | — |
| | 24+ | 4 | 2 | 2 | — |
| | Min | 7 | 7 | 12 | 8 |
| | Max | 26 | 26 | 24 | 19 |
| | Mean | 16.6 | 16.5 | 16.7 | 13.6 |
| Gender | Female | 20 | 11 | 9 | 19 |
| | Male | 22 | 10 | 12 | 15 |

TABLE 3

Assessment of robustness

| Voxel Significance Threshold ($\alpha_1$) | Cluster Significance Threshold ($\alpha_2$) | | | |
|---|---|---|---|---|
| | 5% (uncorrected) | 1% (uncorrected) | 5% (corrected) | 1% (corrected) |
| $\overline{SA}$ at 5% (2 tails) | 0.5435 | 0.5460 | 0.5528 | 0.5485 |
| $\overline{SB}$ at 5% (2 tails) | 0.6670 | 0.6913 | 0.7454 | 0.7340 |
| $\overline{SA}$ at 1% (2 tails) | 0.4490 | 0.4512 | 0.4795 | 0.4820 |
| $\overline{SB}$ at 1% (2 tails) | 0.5732 | 0.5858 | 0.6379 | 0.6390 |

SA (% overlap of voxels),
SB (% overlap of clusters).

TABLE 4

Comparison of thresholds ($\alpha_1$, $\alpha_2$) based AUC
AUC is tested by Wilcox-Mann-Whitney test
(1-tailed); p-values are in parentheses.

| | Cluster size threshold ($\alpha_2$) | | | |
|---|---|---|---|---|
| Voxel significance threshold ($\alpha_1$) | 5% uncorrected (p-value) | 1% uncorrected (p-value) | 5% corrected (p-value) | 1% corrected (p-value) |
| 5% | 0.653 (0.020) | 0.654 (0.018) | 0.683 (0.005) | 0.678 (0.007) |
| 1% | 0.651 (0.021) | 0.648 (0.023) | 0.653 (0.020) | 0.655 (0.018) |

AUC is tested by Wilcox-Mann-Whitney test (1-tailed); p-values are in parentheses.

TABLE 5

Statistics from the ROC analysis of EZ-MAP

| Threshold Values | Specificity | Sensitivity | Negative Predictive Value | Positive Predictive Value | Optimal Cut-off value |
|---|---|---|---|---|---|
| $\alpha_1$ = 5% (2-tails) $\alpha_2$ = 1% (corrected) | 0.762 (=16/21) | 0.647 (=22/34) | 0.57 | 0.815 | 12,632 |
| $\alpha_1$ = 1% (2-tails) $\alpha_2$ = 1% (corrected) | 0.667 (=14/21) | 0.647 (=22/34) | 0.56 | 0.767 | 3,176 |
| $\alpha_1$ = 1% (2-tails) $\alpha_2$ = 5% (uncorrected) | 0.762 (=16/21) | 0.647 (=22/34) | 0.57 | 0.815 | 10,221 |

EZ values were thresholded at three pairs of significance levels ($\alpha_1$, $\alpha_2$), shown in the $1^{st}$ column. In the ROC analysis, the optimal cut-off number of abnormal voxels for discrimination of patients and controls is the point closest to the top-left corner of the ROC plot.

TABLE 6

Assessment of discriminatory ability

| Number of abnormal white matter voxels | Mean number of abnormal voxels (SD) | | Significance of group difference: |
|---|---|---|---|
| | Controls (n = 21) | mTBI Patients (n = 34) | 2-tailed p value (1-tailed) |
| All abnormal voxels | 9,696 (7,867) | 17,850 (13,319) | 0.014 (0.007) |
| Abnormally low FA | 3,326 (3,963) | 7,939 (9,161) | 0.034 (0.017) |
| Abnormally high FA | 6,370 (5,934) | 9,911 (8,456) | 0.099 (0.049) |

TABLE 7

Discriminatory power of EZ-MAP

| Threshold Values | Specificity | Sensitivity | Negative Predictive Value | Positive Predictive Value | Cut-off Threshold |
|---|---|---|---|---|---|
| $\alpha_1$ = 0.01 (2-tails) $\alpha_2$ = 0.01 (corrected) | 0.667 (=14/21) | 0.647 (=22/34) | 0.56 | 0.767 | 3,176 |
| $\alpha_1$ = 0.005 (2-tails) $\alpha_2$ = 0.01 (corrected) | 0.762 (=16/21) | 0.529 (=18/34) | 0.502 | 0.783 | 3,176 |

TABLE 7-continued

Discriminatory power of EZ-MAP

| Threshold Values | Specificity | Sensitivity | Negative Predictive Value | Positive Predictive Value | Cut-off Threshold |
|---|---|---|---|---|---|
| $\alpha_1 = 0.001$ (2-tails) $\alpha_2 = 0.01$ (corrected) | 0.905 (=19/21) | 0.294 (=10/34) | 0.442 | 0.834 | 3,176 |

EZ values were thresholded at three pairs of levels ($\alpha_1$, $\alpha_2$) in the 1$^{st}$ column.

REFERENCES

For Sections I and III of Experimental Details

1. Ducreux D, Rutgers D R, Toulgoat F, Cazejust J, Fillard P, Lasjaunias P. White matter abnormalities in mild traumatic brain injury: A diffusion tensor imaging study. American Journal of Neuroradiology. 2008; 29(3):514-519.
2. Kinnunen K M, Greenwood R, Powell J H, et al. White matter damage and cognitive impairment after traumatic brain injury. Brain. 2011; 134(Pt 2):449-463.
3. Kraus M F, Susmaras T, Caughlin B P, Walker C J, Sweeney J A, Little D M. White matter integrity and cognition in chronic traumatic brain injury: a diffusion tensor imaging study. Brain. 2007; 130:2508-2519.
4. Lipton M L, Gellella E, Lo C, et al. Multifocal white matter ultrastructural abnormalities in mild traumatic brain injury with cognitive disability: a voxel-wise analysis of diffusion tensor imaging. Journal of neurotrauma. 2008; 25(11): 1335-1342.
5. Lipton M L, Gulko E, Zimmerman M E, et al. Diffusion-Tensor Imaging Implicates Prefrontal Axonal Injury in Executive Function Impairment Following Very Mild Traumatic Brain Injury. Radiology. 2009; 252(3):816-824.
6. Mac Donald C L, Johnson A M, Cooper D, et al. Detection of blast-related traumatic brain injury in U.S. military personnel. N Engl J. Med. 2011; 364(22):2091-2100.
7. Palacios E M, Fernandez-Espejo D, Junque C, et al. Diffusion tensor imaging differences relate to memory deficits in diffuse traumatic brain injury. BMC Neurol. 2011; 11:24.
8. Singh M, Jeong J, Hwang D, Sungkarat W, Gruen P. Novel diffusion tensor imaging methodology to detect and quantify injured regions and affected brain pathways in traumatic brain injury. Magn Reson Imaging. 2010; 28(1):22-40.
9. Warner M A, Marquez de la Plata C, Spence J, et al. Assessing spatial relationships between axonal integrity, regional brain volumes, and neuropyschological outcomes after traumatic axonal injury. Journal of neurotrauma. 2010; 27(12):2121-2130.
10. Kou Z, Wu Z, Tong K A, et al. The role of advanced MR imaging findings as biomarkers of traumatic brain injury. J Head Trauma Rehabil. 2010; 25(4):267-282.
11. Muller H P, Unrath A, Riecker A, Pinkhardt E H, Ludolph A C, Kassubek J. Intersubject variability in the analysis of diffusion tensor images at the group level: fractional anisotropy mapping and fiber tracking techniques. Magn Reson Imaging. 2009; 27(3):324-334.
12. Viviani R, Beschoner P, Jaeckle T, Hipp P, Kassubek J, Schmitz B. The bootstrap and cross-validation in neuroimaging applications: estimation of the distribution of extrema of random fields for single volume tests, with an application to ADC maps. Hum Brain Mapp. 2007; 28(10): 1075-1088.
13. Chung S, Pelletier D, Sdika M, Lu Y, Berman J I, Henry R G. Whole brain voxel-wise analysis of single-subject serial DTI by permutation testing. Neuroimage. 2008; 39(4): 1693-1705.
14. Nichols T E, Holmes A P. Nonparametric permutation tests for functional neuroimaging: a primer with examples. Hum Brain Mapp. 2002; 15(1):1-25.
15. Friston K J, Worsley K J, Frackowiak R S J, Mazziotta J C, Evans A C. Assessing the significance of focal activations using their spatial extent. Hum Brain Mapp. 1994; 1:210-220.
16. Becla L, Lunshof J E, Gurwitz D, et al. Health technology assessment in the era of personalized health care. Int J Technol Assess Health Care. 2011; 27(2):118-126.
17. Curran M E, Platero S. Diagnostics and personalized medicine: observations from the World Companion Diagnostics Summit Pharmacogenomics. 2011; 12(4):465-470.
18. Kumar D. The personalised medicine. A paradigm of evidence-based medicine. Ann 1st Super Sanita. 2011; 47(1):31-40.
19. Li C. Personalized medicine—the promised land: are we there yet? Clin Genet. 2011; 79(5):403-412.
20. Ma Q, Lu A Y. Pharmacogenetics, pharmacogenomics, and individualized medicine. Pharmacol Rev. 2011; 63(2): 437-459.
21. Sato Y, Laird N M, Yoshida T. Biostatistic tools in pharmacogenomics—advances, challenges, potential. Curr Pharm Des. 2010; 16(20):2232-2240.
22. Hong J H, Kim O L, Kim S H, Lee M Y, Jong S H. Cerebellar peduncle injury in patients with ataxia following diffuse axonal injury. Brain Res Bull. 2009; 80(1-2): 30-35.
23. Efron B. Bootstrap methods: another look at the jacknife. Ann Stat. 1979; 7(1):1-26.
24. Institute of Mathematical Statistics., LePage R, Billard L. Exploring the limits of bootstrap. New York: Wiley, 1992: 99-124.
25. Benson R R, Meda S A, Vasudevan S, et al. Global white matter analysis of diffusion tensor images is predictive of injury severity in traumatic brain injury. J. Neurotrauma. 2007; 24(3):446-459.
26. Holli K K, Waljas M, Harrison L, et al. Mild traumatic brain injury: tissue texture analysis correlated to neuropsychological and DTI findings. Acad Radiol. 2010; 17(9): 1096-1102.
27. Marquez de la Plata C D, Yang F G, Wang J Y, et al. Diffusion tensor imaging biomarkers for traumatic axonal injury: analysis of three analytic methods. J Int Neuropsychol Soc. 2011; 17(1):24-35.
28. Mathias J L, Bigler E D, Jones N R, et al. Neuropsychological and information processing performance and its relationship to white matter changes following moderate and severe traumatic brain injury: a preliminary study. Appl Neuropsychol. 2004; 11(3):134-152.
29. Nakayama N, Okumura A, Shinoda J, et al. Evidence for white matter disruption in traumatic brain injury without macroscopic lesions. J Neurol Neurosurg Psychiatry. 2006; 77(7):850-855.
30. Newcombe V F, Williams G B, Scoffings D, et al. Aetiological differences in neuroanatomy of the vegetative state: insights from diffusion tensor imaging and functional implications. J Neurol Neurosurg Psychiatry. 2010; 81(5): 552-561.

31. Wilde E A, Chu Z, Bigler E D, et al. Diffusion tensor imaging in the corpus callosum in children after moderate to severe traumatic brain injury. J. Neurotrauma. 2006; 23(10):1412-1426.
32. Wu T C, Wilde E A, Bigler E D, et al. Longitudinal changes in the corpus callosum following pediatric traumatic brain injury. Dev Neurosci. 2010; 32(5-6):361-373.
33. Oni M B, Wilde E A, Bigler E D, et al. Diffusion tensor imaging analysis of frontal lobes in pediatric traumatic brain injury. J Child Neurol. 2010; 25(8):976-984.
34. Peru A, Beltramello A, Moro V, Sattibaldi L, Berlucchi G. Temporary and permanent signs of interhemispheric disconnection after traumatic brain injury. Neuropsychologia. 2003; 41(5):634-643.
35. Plas J, Brion F, Jeanneau A, Chevalier J F, Dussaux P, Brion S. [Contradictions in an original case. Contradictory psychiatric behavior after traumatic injury of the anterior part of the corpus callosum]. Rev Neurol (Paris). 1999; 155(8):569-574.
36. Sharp D J, Beckmann C F, Greenwood R, et al. Default mode network functional and structural connectivity after traumatic brain injury. Brain. 2011; 134(Pt 8):2233-2247.
37. Smith S M, Johansen-Berg H, Jenkinson M, et al. Acquisition and voxelwise analysis of multi-subject diffusion data with tract-based spatial statistics. Nat Protoc. 2007; 2(3):499-503.
38. Smith S, Jenkinson M, Woolrich M W, et al. Advances in functional and structural MR image analysis and implementation as FSL. Neuroimage. 2004; 23(suppl 1):S208-S219.
39. Lim K, Ardekani B A, Nierenberg J, Butler P D, Javitt D C, Hoptman M J. Voxelwise correlational analyses of white matter integrity in multiple cognitive domains in schizophrenia. Am J. Psychiatry. 2006; 163(11):2008-2010.
40. Ardekani B. A fully automatic multimodality image registration algorithm. J Comput Assist Tomogr. 1995; 19(4): 615-623.
41. Ardekani B, Guckemus S, Bachman A, Hoptman M J, Wojtaszek M, Nierenberg J. Quantitative comparison of algorithms for inter-subject registration of 3D volumetric brain MRI scans. J Neurosci Methods. 2005; 142(1):67-76.
42. Holmes C, Hoge R, Collins L, Woods R, Toga A W, Evans A C. Enhancement of MR images using registration for signal averaging. J Comput Assist Tomogr. 1998; 22(2): 324-333.
43. Oishi K, Faria A V, Mori S. JHU-MNI-ss Atlas. 2010.
44. Yang F G, Shan Z Y, Kruggel F. White matter lesion segmentation based on feature joint occurrence probability and chi(2) random field theory from magnetic resonance (MR) images. Pattern Recognition Letters. 2010; 31(9): 781-790.

II. Robust Detection of Traumatic Axonal Injury in Individual Mild Traumatic Brain Injury Patients: Intersubject Variation, Change Over Time and Bidirectional Changes in Anisotropy Introduction and Summary The full citations for the references referred to in Section II of Experimental Details are listed below.

The purpose of this study was to identify otherwise occult inter-individual spatial variation of white matter abnormalities across mild traumatic brain injury (mTBI) patients. Diagnosis of mTBI is typically based on history and examination. Diagnostic criteria include Glasgow Coma Scale (GCS) of 13-15, loss of consciousness not exceeding 20 minutes, posttraumatic amnesia not exceeding 24 hours and absence of neurological deficits (1). Animal studies (2-9) indicate that TBI, including mild injury (6-9), results in traumatic axonal injury (TAI), the presumptive pathological substrate of clinical deficits seen in humans (10-12). Despite the strong consensus that clinical manifestations of mTBI are a consequence of TAI, widely used diagnostic tests such as CT and MR imaging, generally have not provided evidence of brain abnormalities (13).

Diffusion tensor imaging (DTI) reveals evidence of TAI in animal models of TBI (e.g., (14-16)) and in patients, where brain abnormalities detected by DTI are associated with important clinical outcomes (e.g., 17-19). Recent studies have used DTI to link specific functional impairment after mTBI to injury at specific brain regions (e.g., 12, 20-24). These studies compared groups of patients, implicitly assuming that location of injury will be the same across patients. The wide variation in the direction and magnitude of forces applied during head injury makes this assumption highly improbable (25, 26). In addition, DTI must be analyzed at the individual subject level to be useful as a patient-oriented diagnostic tool.

Diffusion tensor imaging (DTI) (3.0 T) was performed in 34 mTBI patients (19 women; 19-64 years old) and 30 healthy control subjects. The patients were imaged within 2 weeks of injury, 3 months after injury, and 6 months after injury. Fractional anisotropy (FA) images were analyzed in each patient. Enhanced Z-score Microstructural Assessment of Pathology (EZ-MAP) was applied to examine white matter diffusion abnormalities across the entire brain of individual patients. The analysis revealed areas of abnormally low or high FA (voxel-wise P-value<0.05, cluster-wise P-value<0.01 (corrected for multiple comparisons)). The spatial pattern of white matter FA abnormalities varied among patients. Areas of low FA were consistent with known patterns of traumatic axonal injury. Areas of high FA were most frequently detected in the deep and subcortical white matter of the frontal, parietal, and temporal lobes, and in the anterior portions of the corpus callosum. Number of both abnormally low and high FA voxels changed during follow up. Personalized assessments reveal unique spatial patterns of white matter abnormalities in each patient, attributable to inter-individual differences in anatomy and mechanism of injury.

Materials and Methods

Study Subjects

After Institutional Review Board (IRB) approval, compliance with the Health Insurance Portability and Accountability Act (HIPAA) and written informed consent, subjects were prospectively enrolled, distinct from clinical care. Thirty-four consecutive patients with mTBI, meeting inclusion and exclusion criteria (Table 1), were recruited from the emergency department of a single urban hospital between August 2006 and May 2010. Patients presented 2-14 days following mild head injury due to falls (n=16), assault (n=11), motor vehicle accidents (n=5), impact by a moving object (n=3) or sports (n=1). Follow-up imaging was performed at 3 months (n=16) and 6 months (n=10) after injury. Thirty control subjects, with age and gender distribution encompassing that of the patients, were recruited through advertisements. Control subjects underwent the same MR imaging protocol as patients. Similarity of the patient and control groups was confirmed with $\chi^2$ (gender) and Student t (age) tests. Controls met all patient exclusion criteria included (a) history of head injury, (b) history of neurologic or psychiatric disease, and (c) history of illicit drug use.

Data Acquisition

Imaging was performed at 3.0-T (Achieva; Philips Medical Systems, Best, the Netherlands) using an eight-channel head coil (Sense Head Coil; Philips Medical Systems). T1-weighted whole-head structural imaging was performed using sagittal three-dimensional magnetization-prepared rapid acquisition gradient echo (MP-RAGE; 9.9/4.6; field of view, 240 mm; matrix, 240×240; and section thickness, 1 mm) T2-weighted whole-head imaging was performed using axial two-dimensional turbo spin-echo (4000/100; field of view, 240 mm; matrix, 384×512; and section thickness, 4.5 mm) and axial two-dimensional fluid-attenuated inversion recovery turbo spin-echo (1100/120; inversion time, 2800 msec; field of view, 240 mm; matrix, 384×512; section thickness, 4.5 mm; and average number of signals acquired, one) imaging. DTI was performed using single-shot echo-planar imaging (3800/88; field of view, 240 mm; matrix, 112×89; section thickness, 4.5 mm; independent diffusion sensitizing directions, 32; and b=1000 sec/mm$^2$).

Data Analysis

Two American Board of Radiology certified neuroradiologists independently reviewed MR images of all subjects (patients and controls) in random sequence during a single session, blind to clinical information and group membership (patient or control).

The 33 diffusion-weighted image sets (32 diffusion sensitizing directions and the b=0 sec/mm$^2$ image) were corrected for head motion and eddy current effects using an affine registration algorithm. FA was derived from DTI at each voxel using the FMRIB Diffusion Toolbox (27).

Quantitative Image Analysis

Skull Stripping:

Non-brain voxels were removed from the MP-RAGE and turbo spin-echo images using FMRIB-FSL software (28). Each brain volume was inspected section-by-section, and residual non-brain voxels were removed manually.

Echo-Planar Imaging Distortion Correction:

Turbo spin-echo images were acquired with the same section thickness, position and orientation as DTI. Distortion correction was accomplished using a nonlinear deformation algorithm to match each echo-planar image to the corresponding turbo spin-echo volumes (29).

Intermediate Rigid-Body Registration:

Each subject's turbo spin-echo images were registered to their three-dimensional MP-RAGE volume using the Automated Registration Toolbox three-dimensional (30) rigid-body approach (31).

Registration to Standard Space:

The nonlinear registration module of the Automated Registration Toolbox was used to register each subject's three-dimensional MP-RAGE volume to a standard T1-weighted template (Montreal Neurological Institute atlas; MNI) (32).

Transformation of DTI to Standard Space:

Using the Automated Registration Toolbox, distortion correction, intermediate rigid-body registration, and standard space registration were applied to the calculated FA maps in a single resectioning operation. Final cubic voxel size was 1 mm$^3$, masked to exclude non-brain voxels from the analysis.

Segmentation:

The fast automated segmentation tool in the FMRIB-FSL package (28) was used to generate a white matter mask for the three-dimensional MP-RAGE template brain images and restrict subsequent statistical analysis of FA to white matter voxels.

Segmentation of White Matter Regions:

The Johns Hopkins University (JHU) white matter atlas (33) was adapted for segmentation of white matter subregions. Using FLIRT from the FMRIB-FSL package (28), the T1-weighted JHU white matter atlas was registered to the T1-weighted template. The resulting transformation matrix was applied to the white matter segmentation volume of the JHU white matter atlas to bring it into registration with the MNI template used for DTI analysis.

Prior to subsequent voxelwise analyses, multiple linear regression analysis of the effects of age, gender, and education was performed within 30 control subjects. Regression coefficients were applied to each patient's FA image, but only at locations where effects of covariates on individual control FA voxels were significant at p<0.05 and where more than 100 significant voxels formed a contiguous cluster.

Enhanced Z-Score (EZ) Analysis

Whole-brain voxel-wise Z-score, optimized for assessment of individual patients, was used to discriminate abnormally low and high FA in each individual patient compared to the control group. The analysis was performed separately for each patient's spatially normalized (Montreal Neurological Institute (MNI)) and regression-adjusted (for demographic covariates) FA volume. Optimal thresholds to maximize specificity and sensitivity were determined based on a Receiver Operating Characteristic (ROC) analysis, presented previously (34). A voxel level threshold of P<0.05 and cluster size threshold P<0.01 (corrected for multiple comparisons) maximized the area under the ROC curve and were used to generate results for this study.

Results

The patient and control populations did not differ significantly with respect to age or gender (Table 8). There was a difference in education (P=0.0002) between controls and patients, but this was adjusted for as described above. Structural MRI (i.e., images other than DTI) did not show evidence of hemorrhage, edema, structural or signal abnormalities.

Areas of abnormally low FA were detected in 32 of 34 patients within two weeks of injury, in areas typically associated with traumatic axonal injury including the corona radiata (anterior and superior), splenium of the corpus callosum, precentral white matter, internal capsule, and deep and subcortical white matter (Table 9). Areas of abnormally high FA were detected in 32 of 34 patients, most frequently in the corona radiata (anterior and superior), deep and subcortical frontal white matter, and in the genu and body of the corpus callosum. Abnormally high FA was found in the splenium of the corpus callosum of only 6 out of 34 subjects (Table 10). The spatial pattern of white matter FA abnormalities varied from patient to patient.

Most patients who were imaged at 3 months post-injury were found to have areas of abnormally high (15/16) and low (14/16) FA. Eleven of these 16 patients had greater number of abnormally high FA voxels when compared to the initial measurement (Table 11). Ten of the 16 patients had fewer abnormally low FA voxels when compared to their initial assessments. There was an overall trend toward greater number of abnormally high FA voxels and lesser number of abnormally low FA voxels at 3 months, in comparison to the initial assessment (within 2 weeks of mTBI).

Ten patients returned for follow-up at 6 months post-injury.ABnormally high FA voxels were detected in all patients completing this follow-up evaluation whereas abnormally low FA voxels were detected in only 7 patients. Six out of 10 patients had fewer abnormally high FA voxels when compared to either of their earlier assessments. Five out of 10 patients had fewer abnormally low FA voxels when compared to either of their earlier assessments. Overall, the trend of temporal change differed between abnormally low and high FA. The most abnormally high FA voxels were found at three months, with a subsequent decrease at 6 months. The number of abnormally low FA voxels, however, declined at 3 months and still further at 6 months (Table 12).

To determine areas where similar brain loci were abnormal across patients, a 1-sample T-test was performed on the EZ maps from each of the 7 patients who completed all 3 assessments. The null hypothesis was that the mean EZ of patients at a given location would be equal to zero. Thus, a determination to reject the null hypothesis would indicate a significant deviation from the control group mean at that location.

Details of the 1-sample T-test are as follows. An Enhanced Z-score ($EZ_i$) of $i^{th}$ mTBI patient at a voxel (voxel location index is omitted) is written as $$EZ_i = \frac{X_i - \bar{Y}}{S_Y \hat{\sigma}^B},$$

where $X_i$ is FA of $i^{th}$ patient; ($\bar{Y}$, $S_Y$) is mean and SD of control group, respectively; $\hat{\sigma}^B$ is bootstrap SD estimate of Z-scores. T-score for the 1-sample t-Test with null hypothesis that is the mean Enhanced Z-scores of patients would be equal to zero is written as $$T = \frac{\sqrt{n_x}\,\overline{EZ}}{SD(EZ)} = \frac{\sqrt{n_x}\,(\bar{X} - \bar{Y})}{SD(EZ)S_Y \hat{\sigma}^B} = \frac{\sqrt{n_x}\,(\bar{X} - \bar{Y})}{S_X} \sim t(n_x - 1) \text{ since}$$

$$SD(EZ_i) = \frac{S_X}{S_Y \hat{\sigma}^B}$$

(SD of Enhanced Z-scores of patients), where $S_x$ is SD of FAs from patients, and $n_x$ is the number of patient.

Results demonstrated increasing number of abnormally high FA voxels at 3 months followed by a decrease at 6 months. The number of abnormally low FA voxels decreases steadily at 3 and 6 months. These group findings are consistent with the patterns found in individual patients Discussion EZ-MAP was used to reveal evidence of traumatic axonal injury (TAI) in individual mTBI patients at a range of times following injury, thus adding to the body of evidence indicating that brain tissue injury occurs after mild head trauma, even when conventional MR images appear normal. This study breaks important new ground, however, by demonstrating significant inter-individual differences in TAI. Although several brain regions are consistently affected across most patients, the pattern of abnormalities is unique in each individual. This finding may be explained by the interaction of the unique characteristics of each patient and the particular biomechanical features of each injury. The fact that certain brain areas (e.g., corpus callosum) are commonly abnormal likely reflects a greater susceptibility of these structures to TBI, as described in prior studies of diffuse axonal injury (35). Even within these susceptible structures, however, the pattern, extent and magnitude of the abnormalities are variable. Variation of mTBI pathology between patients is expected; consideration of this variation may improve diagnosis and prognosis based on DTI and provide a useful personalized proxy endpoint for future clinical trials of TBI treatment. The intersubject variation revealed here would be left undetected in a group-wise analysis.

FA was chosen for study because it has been the diffusion parameter most widely explored and has yielded the greatest number of findings in TBI. Several studies have supported the use of FA for identifying white matter abnormalities in mTBI (18, 36, 37). FA has also been found to be robust for detection of axonal pathology in experimental studies (38). Nonetheless, the EZ-MAP approach could be applied to maps of axial, radial or mean diffusivity, as well as other quantitative imaging parameters.

Areas of abnormally low FA consistent with TAI were detected in almost all patients within 2 weeks of injury (32/34 patients). This finding is consistent with animal and human studies reporting the pathological substrates of diffusion anisotropy and imaging features of mTBI (e.g., (39)). In white matter, water diffuses more readily parallel to axons because its diffusion in other directions is restricted by subcellular structure including neurofilaments, microtubules, myelin and the axolemma. Intra-axonal microstructural disturbances and degradation of the myelin sheath have been demonstrated using DTI, in the absence of frank axotomy (40). The shear forces exerted on an axon during even mild head trauma have been reported to cause axonal pathology, with or without ultimate axotomy (41). The present patients sustained mild head injury and as far as it is possible to know, they have no other reasons to have white matter disease. The cohort was carefully screened to exclude confounding variables and no patients had any visible abnormalities on conventional imaging. The findings thus underscore the fact that mild head trauma causes actual brain injury and that it is detectable at the single subject level.

The abnormally high FA detected in the great majority (32/34 patients) of the patients within 2 weeks of injury is a particularly interesting finding. Biophysically, this phenomenon is unexpected because the loss or disruption of white matter microstructure by mTBI would be expected to manifest as low FA. However, in this study and several others, high FA in the corpus callosum has been detected 72 hours (42), 6 days (45) and 2 weeks (43) after mTBI. These few studies that have found and discussed findings of high FA have assessed patients close to the time of injury and generally put forth the explanation that axonal swelling in the acute post-injury period due to an intracellular influx of water (i.e., cytotoxic edema) leads to restriction of diffusion within the extracellular space, resulting in increased anisotropic diffusion and therefore higher FA. However, a study of chronic mTBI patients also showed high FA in the internal capsule (44).

The time course of evolving high FA in the present study, though heterogeneous, provides some intriguing clues to pathophysiology. The finding of high FA in all patients at 3 and 6 months post-injury, as well as in chronic symptomatic mTBI patients (see below), is inconsistent with cytotoxic edema. Though present at 2 weeks, the number of voxels with high FA increased from 2 weeks to 3 months in most patients (11 of 16) and then declined from 3 months to 6 months in many (5 of 7). This profile suggests that elevated FA might represent a biophysical manifestation of a response to brain injury, rather than a direct manifestation of injury pathology.

Increased FA may reflect neuroplastic responses to injury, perhaps through up-regulation of active axoplasmic transport. Notably, local increases in anisotropy have been reported in training experiments, where the brain substrate is presumed to be plasticity (45). Compensatory mechanisms may be most active during the acute and sub-acute periods when the opportunity for repair and recovery is maximal. The observation of decreasing number of low FA voxels is consistent with repair of TAI, while the early increase in or maintenance of number of high FA voxels at 3 months, followed by a decrease in the number of high FA voxels at 6 months post-injury is consistent with the early development of plasticity and other compensatory mechanisms.

The finding of high FA in nearly every patient begs the question as to why high FA has not been detected in most prior DTI studies of mTBI. Prior studies employed group-wise analyses, which are inherently insensitive to variability in the spatial location of abnormalities between patients. This study has shown much variability in the spatial distribution of high FA voxels between patients, which would likely be missed by a group-wise approach.

Outside of the specific study recruitment, many chronic (more than 1 year post-mTBI) symptomatic mTBI patients referred for clinical imaging show areas of abnormally high and low FA. While brain loci previously described to be affected (e.g., corpus callosum) were detected as abnormal in these patients, the locations of abnormality varied between patients.

EZ-MAP detects multifocal abnormally low and high FA, consistent with TAI and plasticity or other compensatory processes, respectively. This effective personalized assessment of mTBI allows one to assess the relationship of each patient's injury to their functional outcome, which might serve to guide future treatments of mTBI.

TABLE 8

Subject Characteristics

| Patient Data | Patients (n = 34) | Controls (n = 30) | P Value |
|---|---|---|---|
| Age (y)* | | | |
| Men | 29.9 ± 6.4 | 36.6 ± 11.9 | 0.07 |
| Women | 38.9 ± 13.2 | 38.1 ± 10.3 | 0.81 |
| Total | 34.9 ± 11.5 (19 – 64) | 37.3 ± 11.0 (20 – 60) | 0.44 |
| No. of men** | 44% (15/34) | 53% (16/30) | 0.11 |
| Education (y)* | 13.1 ± 2.9 (8 – 19) | 17.0 ± 4.4 (7 – 26) | 0.0002 |

Note
mean ± standard deviation (range), unless otherwise indicated.
**Number of patients (percentages)

TABLE 9

Frequently observed regions with abnormally low FA within 2 weeks of mTBI

| Regions | Number of patients out of 34 | % |
|---|---|---|
| Superior corona radiata (R) | 15 | 44.1 (=15/34) |
| Anterior corona radiata (R) | 14 | 41.2 (=14/34) |
| Splenium of corpus callosum (L) | 14 | 41.2 (=14/34) |
| Superior corona radiata (L) | 14 | 41.2 (=14/34) |
| Precentral WM (R) | 12 | 35.3 (=12/34) |
| Posterior Limb of internal capsule (R) | 12 | 35.3 (=12/34) |
| Posterior thalamic radiation (L) | 12 | 35.3 (=12/34) |
| Middle occipital WM (R) | 11 | 32.4 (=11/34) |
| Splenium of corpus callosum (R) | 11 | 32.4 (=11/34) |
| Body of corpus callosum (R) | 11 | 32.4 (=11/34) |
| Posterior limb of internal capsule (L) | 11 | 32.4 (=11/34) |
| Precentral WM (L) | 10 | 29.4 (=10/34) |
| Retrolenticular internal capsule (L) | 10 | 29.4 (=10/34) |

Note:
Patients were only considered to have an abnormality within a region if at least 100 significantly abnormal voxels were present in that region.

TABLE 10

Frequently observed regions with abnormally high FA within 2 weeks of mTBI

| Regions | Number of patients out of 34 | % |
|---|---|---|
| Anterior corona radiata (R) | 21 | 61.8 (=21/34) |
| Superior corona radiata (R) | 19 | 55.9 (=19/34) |
| Body of corpus callosum (R) | 17 | 50.0 (17/34) |
| Superior corona radiata (L) | 17 | 50.0 (=17/34) |
| Anterior corona radiata (L) | 17 | 50.0 (=17/34) |
| Genu of corpus callosum (R) | 15 | 44.1 (15/34) |
| Body of corpus callosum (L) | 13 | 38.2 (=13/34) |
| Superior frontal WM (R) | 12 | 35.3 (=12/34) |
| Posterior corona radiata (L) | 11 | 32.4 (=11/34) |
| Putamen (R) | 10 | 29.4 (=10/34) |
| Posterior corona radiata (R) | 10 | 29.4 (=10/34) |
| Putamen (L) | 10 | 29.4 (=10/34) |

Note:
Patients were only considered to have an abnormality within a region if at least 100 significantly abnormal voxels were present in that region.

TABLE 11

Change in the number of abnormal voxels between acute post-injury period (<2 weeks) and 3 months

| | Low FA | | High FA | |
|---|---|---|---|---|
| Patient | <2 weeks | 3 months | <2 weeks | 3 months |
| 1 | 15139 | 5045 | 7345 | 24367 |
| 4 | 23420 | 14293 | 0 | 18995 |
| 5 | 5389 | 5528 | 14542 | 46653 |
| 8 | 621 | 442 | 1906 | 24686 |
| 10 | 1295 | 12765 | 4040 | 35543 |
| 12 | 2161 | 1095 | 1286 | 2132 |
| 14 | 1409 | 0 | 0 | 0 |
| 15 | 11766 | 13788 | 597 | 18175 |
| 18 | 9184 | 0 | 5624 | 1243 |
| 19 | 17673 | 10206 | 25760 | 20325 |
| 20 | 11827 | 10909 | 17392 | 18693 |
| 21 | 12524 | 20470 | 20282 | 22871 |
| 22 | 15927 | 1290 | 5013 | 1689 |
| 28 | 0 | 532 | 2928 | 4773 |
| 30 | 649 | 578 | 993 | 6126 |
| 31 | 14826 | 2924 | 13534 | 7856 |

TABLE 12

Change over time in the number of abnormal voxels (<2 weeks, 3 months, and 6 months).

| | Low FA | | | High FA | | |
|---|---|---|---|---|---|---|
| | <2 weeks | 3 months | 6 month | <2 weeks | 3 months | 6 months |
| 1 | 15139 | 5045 | 1176 | 7345 | 24367 | 1820 |
| 5 | 5389 | 5528 | 1411 | 14542 | 46653 | 20683 |
| 10 | 1295 | 12765 | 0 | 4040 | 35543 | 979 |
| 12 | 2161 | 1095 | 2179 | 1286 | 2132 | 4944 |
| 14 | 1409 | 0 | 0 | 0 | 0 | 694 |
| 19 | 17673 | 10206 | 12153 | 25760 | 20325 | 3488 |
| 21 | 12524 | 20470 | 17426 | 20282 | 22871 | 3130 |
| 6 | 2352 | NA | 0 | 11078 | NA | 1746 |
| 7 | 38943 | NA | 6681 | 19750 | NA | 4409 |
| 11 | 1246 | NA | 3792 | 1574 | NA | 2986 |
| Mean | 7941 | 7873 | 4906 | 10465 | 21699 | 5105 |
| SD | 7003 | 7182 | 6964 | 9931 | 16725 | 7030 |

Note:
NA—Not available, because the patient failed to come in for the follow up visit. Mean and SD were calculated for each time period with the number of abnormal voxels from 7 patients who completed all 3 follow-ups.

REFERENCES

For Section II of Experimental Details

1. Esselman P, Uomoto J M. Classification of the spectrum of mild traumatic brain injury. Brain Inj. 1995; 9(4):417-424.
2. Povlishock J. Traumatically induced axonal injury: pathogenesis and pathobiological implications. Brain Pathol. 1992; 2(1):1-12.
3. Crooks D. The pathological concept of diffuse axonal injury: its pathogenesis and the assessment of severity. J. Pathol. 1991; 165(1):5-10.
4. Pettus E, Christman C W, Giebel M L, Povlishock J T. Traumatically induced altered membrane permeability: its relationship to traumatically induced reactive axonal change. J. Neurotrauma. 1994; 11(5):507-522.
5. Povlishock J. Traumatically induced axonal damage without concomitant change in focally related neuronal somata and dendrites. Acta Neuropathol. 1986; 70(1):53-59.
6. Povlishock J T, Becker D P, Cheng C L, Vaughan G W. Axonal change in minor head injury. Journal of neuropathology and experimental neurology. 1983; 42(3):225-242.
7. Rubovitch V, Ten-Bosch M, Zohar O, et al. A mouse model of blast-induced mild traumatic brain injury. Exp Neurol. 2011; 232(2):280-289.
8. Greer J E, McGinn M J, Povlishock J T. Diffuse traumatic axonal injury in the mouse induces atrophy, c-Jun activation, and axonal outgrowth in the axotomized neuronal population. J. Neurosci. 2011; 31(13):5089-5105.
9. Spain A, Daumas S, Lifshitz J, et al. Mild fluid percussion injury in mice produces evolving selective axonal pathology and cognitive deficits relevant to human brain injury. J. Neurotrauma. 2010; 27(8): 1429-1438.
10. Meythaler J M, Peduzzi J D, Eleftheriou E, Novack T A. Current concepts: diffuse axonal injury-associated traumatic brain injury. Arch Phys Med Rehabil. 2001; 82(10): 1461-1471.
11. Sharp D J, Ham T E. Investigating white matter injury after mild traumatic brain injury. Curr Opin Neurol. 2011; 24(6):558-563.
12. Little D M, Kraus M F, Joseph J, et al. Thalamic integrity underlies executive dysfunction in traumatic brain injury. Neurology. 2010; 74(7):558-564.
13. Hammoud D, Wasserman B A. Diffuse axonal injuries: a pathophysiology and imaging. Neuroimaging Clin N Am. 2002; 12(2):205-216.
14. Mac Donald C, Dikranian K, Bayly P, Holtzman D, Brody D. Diffusion Tensor Imaging Reliably Detects Experimental Traumatic Axonal Injury and Indicates Approximate Time of Injury. J. Neurosci. 2007; 27(44):11869-11876.
15. Mac Donald C, Dikranian K, Song S K, Bayly P V, Holtzman D M, Brody D L. Detection of traumatic axonal injury with diffusion tensor imaging in a mouse model of traumatic brain injury. Exp Neurol. 2007; 205(1):116-131.
16. Wang S, Wu E X, Qiu D, Leung L H, Lau H F, Khong P L. Longitudinal diffusion tensor magnetic resonance imaging study of radiation-induced white matter damage in a rat model. Cancer Res. 2009; 69(3):1190-1198.
17. Kraus M F, Susmaras T, Caughlin B P, Walker C J, Sweeney J A, Little D M. White matter integrity and cognition in chronic traumatic brain injury: a diffusion tensor imaging study. Brain. 2007; 130:2508-2519.
18. Miles L, Grossman R I, Johnson G, Babb J S, Diller L, Inglese M. Short-term DTI predictors of cognitive dysfunction in mild traumatic brain injury. Brain Inj. 2008; 22(2):115-122.
19. Niogi S N, Mukherjee P, Ghajar J, et al. Extent of Microstructural White Matter Injury in Postconcussive Syndrome Correlates with Impaired Cognitive Reaction Time: A 3 T Diffusion Tensor Imaging Study of Mild Traumatic Brain Injury. AJNR Am J. Neuroradiol. 2008; 29(5):967-973.
20. Niogi S N, Mukherjee P, Ghajar J, et al. Structural dissociation of attentional control and memory in adults with and without mild traumatic brain injury. Brain. 2008; 131 (Pt 12):3209-3221.
21. Geary E K, Kraus M F, Pliskin N H, Little D M. Verbal learning differences in chronic mild traumatic brain injury. J Int Neuropsychol Soc. 2010; 16(3):506-516.
22. Levin H S, Wilde E, Troyanskaya M, et al. Diffusion Tensor Imaging of Mild to Moderate Blast-Related Traumatic Brain Injury and Its Sequelae. J. Neurotrauma. 2010; 27(4):683-694.
23. Hartikainen K M, Waljas M, Isoviita T, et al. Persistent symptoms in mild to moderate traumatic brain injury associated with executive dysfunction. J Clin Exp Neuropsychol. 2010:1-8.
24. Lipton M L, Gulko E, Zimmerman M E, et al. Diffusion tensor imaging implicates prefrontal axonal injury in executive function impairment following mild traumatic brain injury. Radiology. 2009; 252(3):816-824.
25. Kou Z, Wu Z, Tong K A, et al. The role of advanced MR imaging findings as biomarkers of traumatic brain injury. J Head Trauma Rehabil. 2010; 25(4):267-282.
26. Muller H P, Unrath A, Riecker A, Pinkhardt E H, Ludolph A C, Kassubek J. Intersubject variability in the analysis of diffusion tensor images at the group level: fractional anisotropy mapping and fiber tracking techniques. Magn Reson Imaging. 2009; 27(3):324-334.
27. Smith S, Johansen-Berg H, Jenkinson M, et al. Acquisition and voxelwise analysis of multi-subject diffusion data with tract-based spatial statistics. Nat Protoc. 2007; 2(3): 499-503.
28. Smith S, Jenkinson M, Woolrich M W, et al. Advances in functional and structural MR image analysis and implementation as FSL. Neuroimage. 2004; 23(suppl 1):S208-S219.
29. Lim K, Ardekani B A, Nierenberg J, Butler P D, Javitt D C, Hoptman M J. Voxelwise correlational analyses of white matter integrity in multiple cognitive domains in schizophrenia. Am J. Psychiatry. 2006; 163(11):2008-2010.
30. Ardekani B. A fully automatic multimodality image registration algorithm. J Comput Assist Tomogr. 1995; 19(4): 615-623.
31. Ardekani B, Guckemus S, Bachman A, Hoptman M J, Wojtaszek M, Nierenberg J. Quantitative comparison of algorithms for inter-subject registration of 3D volumetric brain MRI scans. J Neurosci Methods. 2005; 142(1):67-76.
32. Holmes C, Hoge R, Collins L, Woods R, Toga A W, Evans A C. Enhancement of MR images using registration for signal averaging. J Comput Assist Tomogr. 1998; 22(2): 324-333.
33. Oishi K, Faria A V, Mori S. JHU-MNI-ss Atlas. 2010.
34. Kim N, Hulkower M, Park Y K, Gardin T, Smith J, Branch C A, Lipton M L. Robust detection of white matter injury in individual patients after mild traumatic brain injury. ISMRM 2011. Montréal, Québec, Canada.
35. McArthur D, Chute D J, Villablanca J P. Moderate and Severe Traumatic Brain Injury: Epidemiologic, Imaging and Neuropathologic Perspectives. Brain Pathology. 2004; 14(2):185-194.
36. Rutgers D R, Toulgoat F, Cazejust J, Fillard P, Lasjaunias P, Ducreux D. White matter abnormalities in mild trau- 37. Inglese M, Makani S, Johnson G, et al. Diffuse axonal injury in mild traumatic brain injury: a diffusion tensor imaging study. JNeurosurg. 2005; 103(2):298-303.
38. Rutgers D R, Toulgoat F, Cazejust J, Fillard P, Lasjaunias P, Ducreux D. White matter abnormalities in mild traumatic brain injury: a diffusion tensor imaging study. AJNR Am J. Neuroradiol. 2008; 29(3):514-519.
39. Mac Donald C L, Dikranian K, Bayly P, Holtzman D, Brody D. Diffusion Tensor Imaging Reliably Detects Experimental Traumatic Axonal Injury and Indicates Approximate Time of Injury. J. Neurosci. 2007; 27(44): 11869-11876.
40. Song S, Sun S W, Ju W K, Lin S J, Cross A H, Neufeld A H. Diffusion tensor imaging detects and differentiates axon and myelin degeneration in mouse optic nerve after retinal ischemia. Neuroimage. 2003; 20(3):1714-1722.
41. Povlishock J, Katz D I. Update of neuropathology and neurological recovery after traumatic brain injury. J Head Trauma Rehabil. 2005; 20(1):76-94.
42. Bazarian J J, Zhong J, Blyth B, Zhu T, Kavcic V, Peterson D. Diffusion tensor imaging detects clinically important axonal damage after mild traumatic brain injury: A pilot study. J. Neurotrauma. 2007; 24(9):1447-1459.
43. Mayer A R, Ling J, Mannell M V, et al. A prospective diffusion tensor imaging study in mild traumatic brain injury. Neurology. 2010; 74(8):643-650.
44. Lo C, Shifteh K, Gold T, Bello J A, Lipton M L. Diffusion Tensor Imaging Abnormalities in Patients with Mild Traumatic Brain Injury and Neurocognitive Impairment. Journal of Computer Assisted Tomography. 2009; 33(2):293-297.
45. Scholz J, Klein M C, Behrens T E, Johansen-Berg H. Training induces changes in white-matter architecture. Nature neuroscience. 2009; 12(11): 1370-1371.

III. Comparison of Techniques Applied to Mild Traumatic Brain Injury

Introduction and Summary

The full citations for the references referred to in Section III of Experimental Details are listed above at the end of Section I.

This study evaluates four statistical analysis methods (standard Z-score, "one vs. many" t-test, FWER-test, and EZ-MAP) adopted for detection of regional FA abnormalities in individual mTBI patients. ROC analyses showed EZ-MAP (specificity 71%, sensitivity 71%), "one vs. many" t-test and standard Z-score (sensitivity 65%, specificity 76% for both methods) resulted in a significant area under the curve (AUC) score for discriminating mTBI patients from controls in terms of the total number of abnormal white matter voxels detected while the FWER test was not significant. EZ-MAP is demonstrated to be robust to assumptions of Gaussian behavior and can serve as an alternative to methods that require strict Gaussian assumptions. EZ-MAP provides a robust approach for delineation of regional abnormal anisotropy in individual mTBI patients.

Materials and Methods

Ethics Statement.

After Albert Einstein College of Medicine Institutional Review Board (IRB) approval, Health Insurance Portability and Accountability Act (HIPAA) compliance and written informed consent, subjects were prospectively enrolled, distinct from clinical care. Thirty-four mTBI patients from one hospital emergency department met inclusion/exclusion criteria (Table 1) and were enrolled between August 2006 and May 2010. Forty-two control subjects with no history of head injury were recruited through advertisements.

DTI Preprocessing.

The American Board of Radiology certified neuroradiologist reviewed MR images of all subjects (patients and controls) in random sequence, blind to clinical information and group membership (patient or control). The 33 diffusion-weighted image sets (32 diffusion sensitizing directions and the $b=0$ $sec/mm^2$ image) were corrected for head motion and eddy current effects using an affine registration algorithm. FA was derived from DTI at each voxel using the FMRIB Diffusion Toolbox (37). Preprocessing procedures implemented for DTI included skull stripping, echo-planar imaging distortion correction, intermediate rigid-body registration, registration to standard space, transformation of DTI to standard space, and white matter segmentation, in sequence. Non-brain voxels were removed from the MP-RAGE and turbo spin-echo images using FMRIB-FSL software (38). Each brain volume was inspected section-by-section, and residual non-brain voxels were removed manually. Turbo spin-echo images were acquired with the same section thickness, position and orientation as DTI. Distortion correction was accomplished using a nonlinear deformation algorithm to match each echo-planar image to the corresponding turbo spin-echo volumes (39). For intermediate rigid-body registration, each subject's turbo spin-echo images were registered to their three-dimensional MP-RAGE volume using the Automated Registration Toolbox (40) three-dimensional rigid-body approach (41). For registration to standard space, the nonlinear registration module in ART was used to register each subject's three-dimensional MP-RAGE volume to a standard T1-weighted template (Montreal Neurological Institute atlas; MNI) (42). For transformation of DTI to standard space, distortion correction, intermediate rigid-body registration, and standard space registration were applied to the calculated FA maps in a single resectioning operation using ART. Final cubic voxel size was 1 $mm^3$, masked to exclude non-brain voxels from the analysis. For white matter segmentation, the fast automated segmentation tool in the FMRIB-FSL package (38) was used to generate a white matter mask for the three dimensional MP-RAGE template brain images and restrict subsequent statistical analysis of FA to white matter voxels.

Adjustment for Demographic Covariate Effects.

Because application of the present methods to clinical settings will require use of ready control data to assess a new patient, it was chosen not to match controls one-to-one with patients. However, controls were chosen with an even distribution of age, gender and educational attainment that fully brackets the range of the patients; no patient age or educational attainment exceeds all controls at either extreme. For the purpose of validation experiments, the control group was subdivided into two similar subgroups of 21 controls each. Adjustments were made for the potential effects of age, gender and education using a linear regression model estimated from one of the subgroups (the reference group). FA images used in subsequent analyses were first adjusted by applying regression coefficients to voxels where effects were significant. Regression coefficients thus determined were applied to FA images of the remaining 21 control subjects ("normal control subjects") and patients, but only at locations where effects on individual voxels were significant at $p<0.05$ and where more than 100 significant voxels formed a contiguous cluster. This approach was taken because application of the regression model to all regions will only add noise to the Gaussian Random Field (GRF), diminishing sensitivity (15).

EZ-MAP.

Figure 6:
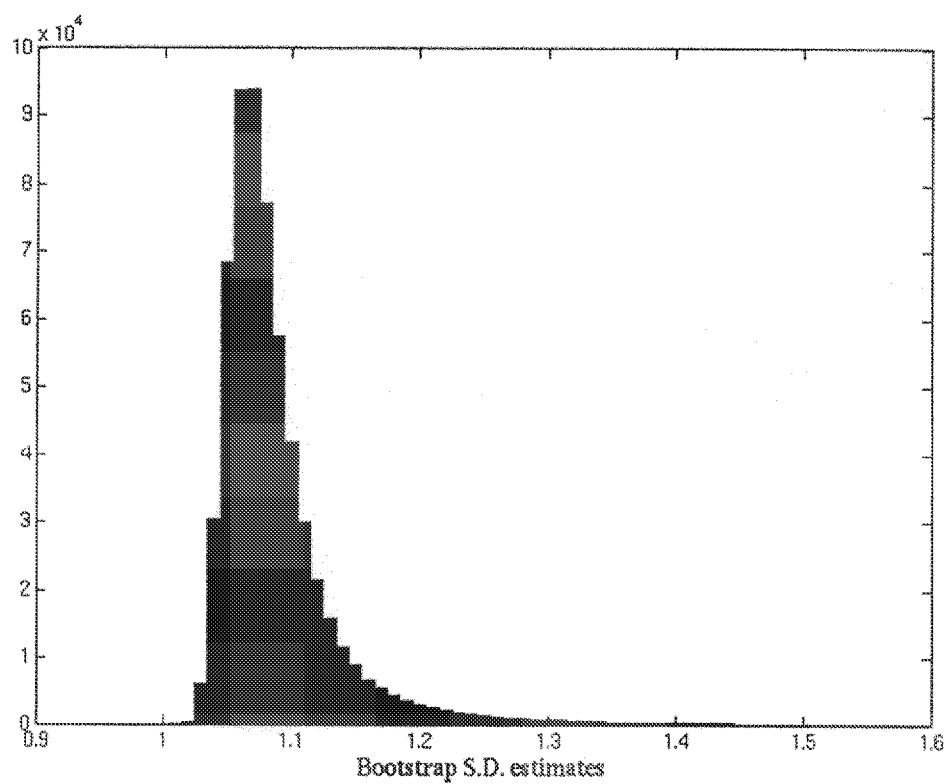
FIG. 6. A histogram of bootstrap standard deviation (SD) estimates, $$\hat{\text{var}}\left(\frac{Y_i - m_i}{s_i}\right) \text{ or } \hat{\sigma}_i^B,$$

A computation was made of the Z-score defined by $$Z = (y - \bar{x})/s \text{ with } s = \sqrt{\sum_{i=1}^{n}(x_i - \bar{x})^2/(n-1)}$$

at each voxel within a subject's FA volume with reference values (mean and Standard Deviation (SD)) computed from the reference control group (n=20), where one subject of the reference group in Table 2 was excluded for this calculation of mean and SD, but all 21 subjects were included for the bootstrap procedure described below. Ideally, although practically impossible, the reference mean and SD used to compute any Z-score should be derived from a very large control group. In the present case, the ideal reference population would include all normal subjects within the demographic parameters defined above; subsets of this population were extracted as the control sample. In practice, the limited size of a control group [e.g., 10-11 subjects as previously reported (4, 8)], relative to the size of the entire reference population may mean that the control group does not optimally represent the full population from which it was selected. Therefore, the control group mean and SD may change with the composition of the selected control group, causing a bias (away from zero) and adding variance to the Z-score. Since the control group mean converges to the population mean at a faster rate than SD, additional variance is likely to be the most important factor contributing to variation of Z-scores across different control subgroups. Inferences based on Z-scores computed using only the control group SD might thus yield an unacceptably high rate of false positive results. Uniform application of higher Z-score thresholds to all voxels can be adopted in an effort to minimize false positive results, but may result in decreased detection power. A bootstrap procedure is used to account for the potential excess variance in the Z-score at each voxel nonparametrically. As used herein, the Z-score based on this bootstrap-adjusted variance is referred to as the Enhanced Z-score (EZ-score). The EZ-score at voxel (i) is then given in Equation (1)

$$EZ_i = \frac{Z_i}{\bar{\sigma}_i^B} \tag{1}$$

where $\bar{\sigma}_i^B$ is the bootstrap SD estimate at voxel i from the proposed bootstrap procedure. The estimated variance from the bootstrap procedure for estimation of sample-to-sample variation of Z-scores may be greater than 1 (FIG. 6). Therefore, determining abnormalities based on the EZ-score in Equation (1) will be more conservative than the assessment with the standard Z-score. The EZ-score approach adjusts each Z-score, with its potential variability induced by differing the reference group, and produces more robust results. This approach may provide a better coverage rate for FA values from new normal control subjects who were not part of the control group used for estimation of the mean and SD, in that the coverage rate is defined by the proportion of voxels lying between $\pm z1-\lambda/2$, with a target coverage rate $(1-\lambda) \times 100(\%)$. For all three coverage rates tested (90%, 95%, 99%), coverage rates for the EZ approach are closer to target rates than those for the standard Z-score approach. Potential variability induced by differing reference groups, which was estimated by the bootstrap SD procedure, was maximal with a smaller reference group and decreased as the number of reference subjects increased. Determination of an abnormality with standard Z-scores based on a small control group may therefore include a substantial number of false discoveries because sample-to-sample variation in FA among the normal control subjects is not accounted for.

Significance was initially determined by assessing the Tail Probability at a voxel i ($TP_i$) of the EZ-score from the standard Gaussian distribution (Equation (2))

$$TP_i = Pr(|EZ_i| \geq z_{\alpha_1/2}) \tag{2}$$

Two levels of thresholding were applied to identify significantly abnormal voxels. First, each voxel must meet a threshold ($\alpha_1$) for the $TP_i$ (Equation (2)) in order to be classified as abnormal. Second, the subset of these voxels that forms contiguous clusters meeting a size threshold ($\alpha_2$) is ultimately classified as abnormal. The threshold for cluster size was determined using GRF theory (15), which determines the significance of each suprathreshold cluster, a set of contiguous voxels which meet the individual voxel threshold ($\alpha_1$). Thresholds were tested both uncorrected and corrected for multiple comparisons.

Receiver operating characteristic (ROC) analysis is suited to the assessment of complex diagnostic methods, such as neuroimaging, where theoretical validation of all aspects of a diagnostic procedure may be impossible. ROC is particularly useful in the present case because it allows simultaneous assessment of multiple threshold values, $\alpha_1$ and $\alpha_2$, which may have a complex relationship to classification power.

ROC analysis requires explicit definition of true positive and false positive states. In the present sample, however, no observable structural brain abnormalities were present on which to base a decision as to the presence of mTBI pathology. Furthermore, microstructural pathology is expected to be present even in the absence of overt imaging abnormalities. Thus, ROC analysis was used to test the utility of EZ-MAP for classification of subjects as patients or normals in terms of the number of abnormal voxels detected. EZ-MAPs were generated for both 34 mTBI patients and 21 "normal control subjects". A separate unique subgroup of normal subjects (not members of the "normal control group" tested [as mentioned at the end of the previous sentence]) was used as the "reference group" for computation of the EZ-MAP in each patient or "normal control subject". That is, none of the "normal control subjects" for whom EZ-MAPs were computed were members of the "reference group" used to provide mean and SD for computation of the EZ-MAPs. The sole role of the "normal control group" in this study was to serve as test subjects or "pseudo-patients". Using a range of combinations of the two thresholds ($\alpha_1$ and $\alpha_2$), ROC analysis identified optimal levels of the two thresholds, where AUC was maximal.

One vs. Many t-Test.

The "one vs. many" t-test (4, 8) utilizes the t-distribution with n−1 (n=size of the reference group) DF. Individual voxels are classified as abnormal based on the t-score defined by $$T_i = Z_i \sqrt{1 + 1/n} \tag{3}$$

However, the t-score strictly requires a Gaussian distribution in order for FA values at each voxel to have the assumed theoretical t distribution with n−1 DF. Although the two-group t-test is known to be robust to deviation from the Gaussian distribution, this property cannot be applied to "one vs. many" t-test because when a patient is compared to a group of control subjects, the central limit theorem, which provides robustness in the two-group t-test, is no longer valid. One way to validate this Gaussian assumption is to compare theoretical variance and variance estimated from the data.

The SD of the t-score can be estimated from the data simply by dividing the bootstrap SD estimate of the Z-score at each voxel by $\sqrt{1 \div 1/n}$. A comparison of the theoretical SD (= $\sqrt{(n-1)/n-1)}$) and bootstrap SD estimates of t-scores demonstrated that the distribution of the bootstrap SD estimates of t-scores is approximately centered (Median=1.05; Mean=1.07) on the theoretical value 1.06 with n=20, but widely spread, indicating deviation from the theoretical t distribution. Inference that voxels are abnormal, based on the theoretical t distribution, may therefore be substantially biased for those voxels located at the tail regions of the histogram. Since about 60% of voxels showed smaller SD estimates than the theoretical SD, determination that voxels are abnormal based on "one vs. many" t-test tends to be conservative and subject to false negative inferences. Further, voxelwise bootstrap SD estimates were classified into 3 classes: (a) under-dispersion, (b) over-dispersion and (c) close to the theoretical SD value by comparing bootstrap SD estimates to the theoretical SD. Over-dispersion was frequently found in peripheral WM regions while under-dispersion was found in the deep white matter. Methods that apply a theoretical SD threshold uniformly across all voxels may thus produce higher false positive or false negative decisions for the over- and under-dispersion regions. Deviation from the theoretical variance suggests deviation from the Gaussian assumption for FA measures. For example, the distribution of FA at a voxel can be a mixture of two Gaussian distributions as in Equation (4)

$$Z \sim \pi_1 \phi\left(\frac{Z-\mu}{\sigma_1}\right) + (1-\pi_1)\phi\left(\frac{Z-\mu}{\sigma_2}\right) \quad (4)$$

with the standard Gaussian density $\phi$, $0<\pi<1$, and $\sigma_i>0$ (i=1, 2). The distribution of FA values in Equation (4) corresponds to a mixture of two subpopulations, each of which has Gaussian distribution with the same mean $\mu$, but different variances. This model may be plausible in certain populations, for example, above a certain age, variance may increase or decrease significantly. Although, in the present study, effects of age on the mean FA were removed by linear regression, heterogeneous variance among age groups may remain. Under an assumption that the sample size (n) for the reference group is sufficiently large, the distribution of t-scores in Equation (3) derived with samples from a mixture Gaussian distribution is found to be a mixture of two t-distributions. Accordingly, classification of a voxel as abnormal based on the theoretical t-distribution is not valid; the coverage rate bounds $(-t_{n-1,\alpha/2}, t_{n-1,\alpha/2})$ from the theoretical t distribution cannot achieve the desired coverage rate $[(1-\alpha)\times 100\%]$ in the presence of a mixed Gaussian distribution as in Equation (4).

Results

Characteristics of the patient and control samples (Table 2) show that the range of age, gender, and years of education of controls fully encompasses those of patients. Furthermore, no significant difference in age (t-test; p=0.289, 0.324) or gender distribution (Chi-squared test; p=0.864, 0.511) was found between each control group and the patient group. However, a significant difference in years of education (t-test; p=0.005, 0.004) was found. 27,290 white matter voxels (4.5% of total white matter volume) met significance criteria for the effects of demographic covariates, dominated by the effect of education. Four axial slices with significant effects of demographic covariates on FA are shown in FIG. 2.

FIG. 3 shows example maps of abnormal FA from three different mTBI patients, demonstrating multiple areas of abnormally high and low FA with significant variation in the size and spatial distribution of FA abnormalities across patients. The determination of abnormality at this stage was defined using thresholds ($\alpha_1$=0.05 (2-tails); $\alpha_2$=0.05 (corrected for multiple comparisons)) determined from the ROC analysis (below).

In assessing diagnostic utility in individual patients, three global metrics were initially investigated: (1) all abnormal white matter voxels across the whole brain, (2) all white matter voxels where FA was significantly lower than normal and (3) all white matter voxels where FA was significantly higher than normal. Table 13 shows AUC and p-values (Wilcox-Mann-Whitney test, 1-tailed) calculated at various levels of the two thresholds, $\alpha_1$ and $\alpha_2$, for the first global metric (all abnormal white matter voxels across the whole brain). Greatest efficacy in making the discrimination between patients and controls, based on maximizing AUC, was found at lower thresholds for $\alpha_1$ and higher thresholds for $\alpha_2$.

Similarly, ROC studies were conducted for the "one vs. many" t-test and the standard Z-approach to find optimal thresholds; these results are summarized in Table 13. All three methods showed maximal AUC scores at $\alpha_1$=0.05 (2-tails); $\alpha_2$=0.05 (corrected for multiple comparisons)). This pattern is opposite to that for FWER control, where thresholds less strict for $\alpha_1$ but fairly strict for $\alpha_2$ yield optimal discrimination power. Table 14 shows the sensitivity and specificity achieved when applying optimized thresholds ($\alpha_1$ and $\alpha_2$) for each method.

Diagnostic utility of the different analysis methods were compared for each of the three global metrics derived at the optimized thresholds [($\alpha_1$=0.05 (2-tails); $\alpha_2$=0.05 (corrected for multiple comparisons) for EZ-MAP, standard Z-score and one vs. many t-test, while FWER-control was tested at 5% for each tail area]. Overall, all of the three global metrics attained significant power to discriminate mTBI patients from controls using EZ-MAP, standard Z-score or "one vs. many" t-test. However, the discrimination power of the FWER control approach was not significant as shown in Table 15. The first global metric (all abnormal FA voxels) was somewhat more significantly different between groups than the other two metrics (all abnormally low FA voxels or all abnormally high FA voxels). As shown in Table 15, the standard Z-score approach identifies the largest number of voxels, while EZ-MAP identifies fewer and the "one vs. many" T-test still fewer abnormalities. The FWER-control identified the fewest voxels as abnormal. Interestingly, the number of abnormal voxels from standard Z-score was about 1.5 times greater than the number from EZ-MAP, and again the number from EZ-MAP was about 1.5 times greater than the number from "one vs. many" t-test. Abnormal regions detected by the standard Z-score should contain more false positives due to underestimation of variance in comparison to EZ-MAP. Since 60% of voxels showed under-dispersion when compared to the expected theoretical variance of the t-distribution, the number of voxels classified as abnormal by the "one vs. many" t-test is excessively conservative. The FWER-control approach is also overly conservative. Robustness of the spatial extent of abnormalities for individual patients derived with different control subjects were explored, as demonstrated in Table 16. Two sets of reference groups (n=20 and n=40; the n=40 group includes the n=20 group plus an additional 20 control subjects) were used separately to assess individual mTBI patients. For each of the three global metrics, the number of abnormal voxels detected by standard Z-score approach greatly decreased as the size of the reference group increased, while "one vs. many" T-test showed the opposite pattern. The regions of abnormally low FA detected with the EZ-score were stable across reference group. Regions of abnormally high FA detected with the EZ-score, however, decreased as the size of the reference group increased.

Discussion

Individualized assessments are needed to guide personalized therapeutic interventions (16-21). Personalized medicine is generally understood to encompass genotype-tailored treatment (16-20), but other unique manifestations of disease demand individualized diagnostic and therapeutic approaches. Individualized assessment of DTI has been reported in only a few studies of TBI, which applied group-wise methods to individuals (4, 6, 8, 22). However, individualized assessments are especially relevant to TBI, where the nature of the injury and its pathologic manifestations will be unique in each individual (10).

Several important considerations were carefully addressed in the implementation and validation of the present approach. First, any study must in practice employ a control group that is a small subset of the population against which determinations of abnormality are to be inferred. This sampling limitation may lead to underestimation of variance in Z-scores and consequent erroneous inferences. EZ-MAP accounts for this potential additional variance by bootstrap, a nonparametric method which resamples the Z-score (i.e., by resampling the composition of the control group). An alternative bootstrap method would first resample the deviation of an individual FA from the mean FA obtained from a control group arriving at a new bootstrap SD quantity, which would then be used in computing the individual patient Z-scores. The former approach was used because it yields a more robust and stable approximation of the true distribution (23, 24). Bias (variability of the control group mean based on its composition) was not incorporated in calculating the EZ-MAP, assuming that bias would be very close to zero. The narrow distribution (particularly around zero) of the mean of resampled Z-scores at each voxel confirms the validity of this assumption.

Differences between the patient and control groups were carefully assessed and accounted for to minimize the chance that covariates such as age, gender and education would be detected as real effects. Notably, significant effects of age, gender and education were modest in magnitude and spatial extent.

EZ-MAP discriminated mTBI patients from normals, showing statistical significance on assessment of area under the ROC curve and significant differences between patients and controls in the number of abnormal voxels detected. In terms of discrimination power, the standard Z-score and "one vs. many" t-test approaches also attained significance while an approach employing FWER-control did not. Although all three methods achieved significant discrimination power, the extent of abnormal regions varied among the methods. Inferences based on the standard Z-score approach tend to produce more false positive findings and those identified with the "one vs. many" t-test yield more false negative inferences. EZ-MAP inferences fall in between these two extremes. Because EZ-MAP is a data-adaptive approach, it is inherently less sensitive to underlying assumptions regarding the composition of the reference group than standard Z-score approach and "one vs. many" t-test.

TABLE 13

Comparison of thresholds ($\alpha_1$, $\alpha_2$) based on AUC.
Cluster size threshold ($\alpha_2$)

| Individual voxel threshold ($\alpha_1$) | 5% uncorrected | 1% uncorrected | 5% corrected | 1% corrected |
|---|---|---|---|---|
| ($\alpha_1 = 5\%$) | | | | |
| EZMAP | 0.701 (0.002) | 0.701 (0.002) | 0.724 (0.000) | 0.702 (0.002) |
| 1 vs. many T | 0.702 (0.002) | 0.710 (0.001) | 0.738 (0.000) | 0.718 (0.001) |
| Z-score | 0.689 (0.004) | 0.692 (0.003) | 0.703 (0.002) | 0.696 (0.003) |
| ($\alpha_1 = 1\%$) | | | | |
| EZMAP | 0.678 (0.007) | 0.668 (0.011) | 0.695 (0.003) | 0.702 (0.002) |
| 1 vs. many T | 0.665 (0.012) | 0.678 (0.007) | 0.705 (0.002) | 0.695 (0.003) |
| Z-score | 0.678 (0.007) | 0.674 (0.008) | 0.685 (0.005) | 0.681 (0.006) |

Note

Discrimination between patients and controls based on a global metric, (all abnormal white matter voxels across the whole brain) assessed by AUC score. AUC is tested by Wilcox-Mann-Whitney test (1-tailed); AUC score and its p-value in parentheses are calculated for each pair of two thresholds.

TABLE 14

Sensitivity and specificity from the ROC analysis.

| | EZ-MAP | "1-vs.-many" T | Z-score | FWER-Control |
|---|---|---|---|---|
| Sensitivity | 0.706 | 0.647 | 0.647 | NA |
| Specificity | 0.714 | 0.762 | 0.762 | NA |

Note

EZ, "one vs. many" T, and Z-scores were thresholded at the $\alpha_1 = 0.05$ (2-tails); $\alpha_2 = 0.05$ (corrected for multiple comparisons). In the ROC analysis, the optimal cut-off number (all abnormal voxels for discrimination of patients and controls) is the point closest to the top-left corner of the ROC curve. Sensitivity and specificity are not applicable because the FWER-control method was not significantly powered in the ROC analysis.

TABLE 15

Assessment of discriminatory ability.

| Number of abnormal white matter voxels | Mean and SD of the numbers of abnormal voxels across subjects | | Significance of group difference (p-value) | |
|---|---|---|---|---|
| | Normal Subjects (n = 21) | mTBI Patients (n = 34) | 2-group T | W-M |
| All Abnormal Voxels | | | | |
| EZ-MAP | 6211 (6282) | 14000 (11108) | 0.003 | 0.000 |
| 1 vs. many T | 3147 (4356) | 8759 (8206) | 0.003 | 0.000 |
| Z-score | 11783 (9393) | 21603 (14459) | 0.004 | 0.002 |
| FWER-control | 1136 (625) | 1459 (1092) | 0.112 | 0.164 |
| Abnormally Low Voxels | | | | |
| EZ-MAP | 2285 (3189) | 6489 (7800) | 0.012 | 0.077 |
| 1 vs. many T | 1058 (2255) | 4134 (6559) | 0.022 | 0.063 |
| Z-score | 4315 (4977) | 9998 (10661) | 0.013 | 0.042 |
| FWER-control | 756 (494) | 941 (753) | 0.161 | 0.253 |
| Abnormally High Voxels | | | | |
| EZ-MAP | 3925 (4463) | 7512 (6850) | 0.019 | 0.007 |
| 1 vs. many T | 2089 (2796) | 4625 (4763) | 0.016 | 0.017 |
| Z-score | 7468 (6845) | 11605 (9232) | 0.041 | 0.046 |
| FWER-control | 380 (539) | 518 (770) | 0.478 | 0.184 |

Note

Mean number of abnormal voxels and SD (in parentheses) detected by each analysis method from each group for each global metric (1) "All" - all abnormal white matter voxels across the whole brain, (2) "Low" - all white matter voxels where FA was significantly higher than normal and (3) "High" - all white matter voxels. Two-group t-test and Wilcox- Mann-Whitney test was conducted for each global metric to compare the numbers of abnormal voxels between normal subjects and mTBI patients.

TABLE 16

Robustness of abnormal detection.

| Number of abnormal white matter voxels | Mean and SD of the numbers of abnormal voxels across 34 patients | | |
|---|---|---|---|
| | Tested with Control subjects n = 40 | Tested with Control subjects n = 20 | Paired t-test (p-value) |
| All abnormal Voxels | | | |
| EZ-MAP | 12965 (11623) | 14000 (11108) | 0.725 |
| 1 vs. many T | 10271 (10534) | 8759 (8206) | 0.537 |
| Z-score | 16516 (13383) | 21603 (14459) | 0.156 |
| Abnormally Low Voxels | | | |
| EZ-MAP | 6400 (8314) | 6489 (7800) | 0.965 |
| 1 vs. many T | 5187 (7641) | 4134 (6559) | 0.566 |
| Z-score | 8129 (9657) | 9998 (10661) | 0.475 |
| Abnormally High Voxels | | | |
| EZ-MAP | 6565 (6548) | 7512 (6850) | 0.590 |
| 1 vs. many T | 5083 (5464) | 4625 (4763) | 0.736 |
| Z-score | 8387 (7738) | 11605 (9232) | 0.149 |

Note

Mean number of abnormal voxels and SD (in parentheses) detected by each analysis method) from each group for each global metric (1) "All"-all abnormal white matter voxels across the whole brain, (2) "Low"-all white matter voxels where FA was significantly higher than normal and (3) "High"-all white matter voxels. Paired t-test was conducted for each global metric to compare numbers of abnormal voxels detected in mTBI patients using each of two reference groups (n = 20, n = 40).

What is claimed is:

1. A method for quantitatively assessing a volumetric image from a subject comprising:
   obtaining a quantitative image volume of the subject that is represented as voxels; and
   using a computer to compare a parameter of each of the voxels being assessed from the image from the subject with a parameter of each of a corresponding voxel from a computer database of images from a control group of subjects, and comparing the parameter of each of the voxels from the image from the subject being assessed as an EZ-score computed for individual voxels wherein the EZ score for a voxel comprises a quotient of a voxel Z-score/a variance of the control group at a corresponding voxel estimated by a bootstrap resampling method, so as to thereby assess whether or not the image from the subject being assessed differs from the images from the control group.

2. The method of claim 1, wherein fractional anisotropy, T1, T2, T2*, proton density, blood flow, blood volume, transit time, permeability, or axial, radial or mean diffusivity, or other quantitative imaging parameter is compared between the subject being assessed and the control group of subjects.

3. The method of claim 1, wherein the image is obtained by magnetic resonance imaging (MRI), computerized tomography (CT) or ultrasound.

4. The method of claim 1, wherein the image is obtained by diffusion MRI, diffusion tensor imaging (DTI), diffusion-weighted imaging (DWI), Diffusion Spectrum Imaging (DSI), High Angular Resolution Diffusion Imaging (HARDI), a diffusion MRI method, magnetization transfer MRI, quantitative T1, T2, T2*, T1rho or proton density MRI, magnetic resonance gated intracranial CSF dynamics (MR-GILD), magnetic resonance perfusion imaging, dynamic contrast enhanced MRI, dynamic susceptibility contrast MRI, arterial spin labeling MRI or magnetic resonance spectroscopy.

5. The method of claim 1, wherein the image is obtained by diffusion tensor imaging (DTI).

6. The method of claim 1, wherein the image is obtained by diffusion tensor imaging (DTI) and wherein fractional anisotropy is compared between the subject being assessed and the control group of subjects.

7. The method of claim 1, wherein the images from the subject being assessed and from the control group are obtained using the same imaging device.

8. The method of claim 1, wherein the control group includes 10-40 subjects.

9. The method of claim 1, wherein the control group includes at least 20 subjects.

10. The method of claim 1, wherein the control group includes 20-30 subjects or 20-40 subjects.

11. The method of claim 1, wherein the control group is a group of subjects who have a known pathology or lesion.

12. The method of claim 1, wherein the control group is a group of normal subjects who do not have a known pathology or lesion.

13. The method of claim 12, wherein differences between the images from the subject being assessed and from the control group indicate that the subject has a pathology or lesion.

14. The method of claim 13, wherein the pathology or lesion is a microscopic pathology or lesion.

15. The method of claim 13, wherein the pathology or lesion is a tumor, infection, demyelinating disease, degenerative disease or ischemia.

16. The method of claim 13, wherein the pathology or lesion results from toxic exposure.

17. The method of claim 13, wherein diffusion tensor imaging is used to detect areas of abnormal fractional anisotropy in the subject's brain that are indicative of mild traumatic brain injury.

18. The method of claim 1, wherein the entire subject is imaged.

19. The method of claim 1, wherein a portion of the subject is imaged.

20. The method of claim 19, wherein the portion of the subject that is imaged comprises the head, brain, neck, thorax, breast, abdomen, limb, arm, forearm, upper arm, leg, lower leg, upper leg, elbow, hip, knee, ankle, foot, brain, lung, heart, stomach, intestine, colon, liver, pancreas or kidney of the subject.

21. The method of claim 19, wherein a voxel by voxel analysis is made across the entire brain.

22. The method of claim 1, wherein the subject is a human.

23. A system for quantitatively assessing an image volume from a subject comprising one or more processors, a memory unit, and a computer-readable medium including computer-readable code that is read by the one or more processors to perform a method comprising the steps of:
   obtaining from the subject a quantitative image volume that is represented as voxels; and
   using a computer to compare a parameter of each of the voxels being assessed from the image from the subject with a parameter of each of a corresponding voxels from a computer database of images from a control group of subjects, and comparing the parameter of each of the voxels from the image from the subject being assessed as an EZ-score computed for individual voxels wherein the EZ score for a voxel comprises a quotient of a voxel Z-score/a variance of the control group at a corresponding voxel estimated by a bootstrap resampling method, so as to thereby assess whether or not the image from the subject being assessed differs from the images from the control group.

* * * * *